(12) United States Patent
Dei

(10) Patent No.: US 7,729,311 B2
(45) Date of Patent: Jun. 1, 2010

(54) IMAGE DATA COMMUNICATION SYSTEM AND IMAGE DATA COMMUNICATION METHOD

(75) Inventor: Hiroaki Dei, Tokyo (JP)

(73) Assignee: NEC Corporation, Tokyo (JP)

( * ) Notice: Subject to any disclaimer, the term of this patent is extended or adjusted under 35 U.S.C. 154(b) by 1185 days.

(21) Appl. No.: 10/559,777

(22) PCT Filed: Jun. 1, 2004

(86) PCT No.: PCT/JP2004/007514

§ 371 (c)(1),
(2), (4) Date: Dec. 7, 2005

(87) PCT Pub. No.: WO2004/112412

PCT Pub. Date: Dec. 23, 2004

(65) Prior Publication Data

US 2006/0258359 A1 Nov. 16, 2006

(30) Foreign Application Priority Data

Jun. 10, 2003 (JP) .............................. 2003-165064
Jun. 27, 2003 (JP) .............................. 2003-184606

(51) Int. Cl.
*H04W 4/00* (2009.01)
*H04W 36/00* (2009.01)
*H04N 5/445* (2006.01)

(52) U.S. Cl. .................. 370/331; 455/441; 455/436; 455/439; 455/442; 725/54

(58) Field of Classification Search .............. 455/414.1, 455/441

See application file for complete search history.

(56) References Cited

U.S. PATENT DOCUMENTS 5,710,798 A * 1/1998 Campana, Jr. ............... 375/347
5,920,817 A * 7/1999 Umeda et al. ............... 455/437

FOREIGN PATENT DOCUMENTS

| JP | 63-233623 | 9/1988 |
|----|-----------|--------|
| JP | 6-334573 | 12/1994 |
| JP | 10-126856 | 5/1998 |
| JP | 10-145342 | 5/1998 |
| JP | 2000-059344 | 2/2000 |
| JP | 2000-078116 | 3/2000 |
| JP | 2000-152307 | 5/2000 |
| JP | 2000-209560 | 7/2000 |
| JP | 2002-246975 | 8/2002 |
| WO | WO 03/030534 | 4/2003 |

* cited by examiner

*Primary Examiner*—Vincent P Harper
*Assistant Examiner*—Timothy Pham
(74) *Attorney, Agent, or Firm*—Young & Thompson

(57) ABSTRACT

An image data communication system that enables a suppression of the loss of data during a handover interval without entailing insufficiency of network resources includes: image data distribution device for sequentially distributing, with prescribed time differences, encoded image data 1 and 2 in which an identical image has been encoded; and image data reception device for receiving encoded image data 1 and 2 that have been distributed from image data distribution device while moving among a plurality of radio areas. Image data reception device, at the time of handover that occurs during movement from a current radio area to another neighboring radio area, receives over a prescribed interval encoded image data 1 and 2 having prescribed time differences that are distributed from image data distribution device, and selects necessary data from the encoded image data 1 and 2 that have been received to reconstruct one set of encoded image data.

25 Claims, 9 Drawing Sheets

IMAGE DATA COMMUNICATION SYSTEM AND IMAGE DATA COMMUNICATION METHOD

TECHNICAL FIELD

The present invention relates to a method, a device, and a system for distributing and/or receiving moving picture image data by way of a mobile communication network. The present invention further relates to a program for distributing and/or receiving this type of moving picture image data.

BACKGROUND ART

In recent years, various methods, in which encoded data realized by high-efficiency compression based on interframe prediction are transmitted, have been used as methods for effectively transmitting moving picture image data. In these transmission methods, a reduction in the amount of information of moving picture image data that have a high correlation in the time direction can be achieved by encoding predicted parameters and predicted residual image data that are obtained by predicting encoded images based on frames that precede and follow in time. In addition, conversion encoding and quantizing the predicted residual moving picture data achieves compression encoding with greater efficiency and thus enables transmission of moving picture image data with a limited transmission bandwidth.

Representative examples of the above-described transmission method include methods that use compression encoding methods such as MPEG (Moving Picture Experts Group)-1, MPEG-2, and MPEG-4. In these compression encoding methods, input image frames are subjected to interframe prediction by motion compensation in units of rectangular regions having a fixed size referred to as "macro-blocks," and the obtained motion vectors and signal data that have been compressed by subjecting the predicted residual image data to two-dimensional discrete cosine transform and quantization are subjected to variable length encoding.

Many methods exist for distributing compression encoded moving picture image compression information such as described above by way of an IP (Internet Protocol) network that uses a packet exchange method. It is expected that in the future, the distribution of moving picture images will be evolved in a mobile communication system in which mobile stations that are constituted by PHS (Personal Handyphone System), portable telephones, or portable terminals that use these devices as communication means are connected by way of radio channels to a radio base station.

However, in a mobile communication system, handover occurs when a mobile station exceeds a radio area (cell) and moves into a neighboring radio area. Normally, the reception level of the radio channel by which communication is realized is monitored in the mobile station, and when handover causes the reception level to fall below a prescribed level, a handover request is transmitted to the network side, and on the network side, the connection destination of the mobile station is switched from the base station before movement to a base station following movement in accordance with the handover request from the mobile station.

However, during a handover interval, the reception of data is halted, bringing about the loss of a large amount of data and deterioration of the quality of the received image. In an encoding method that uses interframe prediction such as MPEG in particular, data that are not subject to prediction are received after the completion of handover, and the quality of the moving picture image data during reception therefore undergoes serious deterioration. This image disturbance also influences succeeding frames.

Mobile communication systems that can reduce the loss of data resulting from handover have been proposed (refer to JP-A-2000-152307 (hereinbelow referred to as the "Patent Document 1")). This mobile communication system is provided with a plurality of base stations that are connected to a network and mobile stations that are selectively connected to these base stations by way of radio channels. A mobile station transmits a request to execute a broadcast procedure to the network when the reception quality of the radio signal from the currently connected base station falls below a prescribed level due to handover. On the network side, communication information addressed to the mobile station is broadcast to the base station that is currently connected to the mobile station and other base stations that are in the vicinity of the currently connected base station in accordance with the execution request from the mobile station. Communication information is then broadcast to the mobile station from the currently connected base station and other base stations that are in the vicinity. By means of this broadcast transmission, the mobile station can instantly obtain the communication information that is addressed to itself upon the completion of handover, and as a result, can reduce the loss of data that is caused by handover.

DISCLOSURE OF THE INVENTION

The following explanation regards the technical problem of the prior art.

As described in the foregoing explanation, the problem exists that when a moving picture image is distributed to a mobile station by way of a radio channel in a mobile communication system, the loss of data during a handover interval causes a serious deterioration in the quality of the received image.

In the mobile communication system that is described in Patent Document 1, a mobile station can instantly acquire communication information that is addressed to itself upon completion of handover, and the loss of data due to handover can therefore be reduced. However, the loss of data during the handover interval cannot be entirely solved by the control of radio power, and the broadcast transmission that is described in Patent Document 1 therefore cannot avoid this loss of data that occurs during a handover interval. As a result, the mobile communication system that is described in Patent Document 1 cannot provide a complete solution to the problem regarding the deterioration of the quality of the received image.

Resending lost data to a mobile station can be considered as another method. However, such a case would result in the simultaneous reception of two types of data in the mobile station: the original image data and the resent image data; and this consequence raises the possibility of overtaxing network resources.

It is therefore an object of the present invention to provide an image data communication system, an image data distribution device, an image data reception device, an image data communication method, and a program that can suppress the loss of data during handover intervals without overtaxing network resources and thus solve the above-described problem.

To achieve the above-described object, the image data communication system of the present invention includes: an image data distribution device for sequentially distributing a plurality of sets of identical moving picture image data with prescribed time differences; and an image data reception device for receiving the moving picture image data that have been distributed from the image data distribution device while moving among a plurality of radio areas; wherein the image data reception device, at a time of handover that occurs when moving from a current radio area to another neighboring radio area, receives over a prescribed interval the plurality of sets of identical moving picture image data having the prescribed time differences that are distributed from the image data distribution device and selects necessary data from the received moving picture image data to reconstruct one set of moving picture image data.

The image data distribution device of the present invention is an image data distribution device that is connected so as to allow communication by way of a transmission line to an image data reception device that moves among a plurality of radio areas; the image data distribution device including: an encoded image data generation means for generating a plurality of sets of identical encoded image data in which identical image data are encoded; encoded image data transmission means for sequentially transmitting on the transmission line the plurality of sets of identical encoded image data that have been generated by the encoded image data generation means with prescribed time differences; and control means for implementing prescribed control setting in the transmission line such that, at the time of handover that occurs when the image data reception device moves from the current radio area to another neighboring radio area, the plurality of sets of identical encoded image data having the prescribed time differences that are transmitted from the encoded image data transmission means are received in the image data reception device over a prescribed interval.

The image data reception device of the present invention is an image data reception device that is connected so as to allow communication by way of a transmission line to an image data distribution device that sequentially distributes, with prescribed time differences, a plurality of sets of identical encoded image data in which an identical image has been encoded; the image data reception device including: an encoded image data reception means for, at the time of handover that occurs when moving from the current radio area to another neighboring radio area, receiving over a prescribed interval the sets of identical encoded image data having the prescribed time differences that have been distributed from the image data distribution device; and a data reconstruction means for selecting necessary data from the sets of identical encoded image data having the prescribed time differences that have been received over the prescribed time interval to reconstruct one set of encoded image data.

The image data communication method of the present invention is an image data communication method that is carried out in a communication system in which an image data distribution device and an image data reception device are connected by way of a transmission line so as to allow communication; the image data communication method including: a first step in which the image data distribution device sequentially distributes sets of identical moving picture image data with prescribed time differences to the image data reception device; and a second step in which the image data reception device, at the time of handover that occurs upon movement of the image data reception device from the current radio area to another neighboring radio area, receives over a prescribed interval the plurality of sets of identical moving picture image data having the prescribed time differences that have been distributed from the image data distribution device, and selects necessary data from the moving picture image data that have been received to reconstruct one set of moving picture image data.

The first program of the present invention is a program that is used in a communication system in which a server and a client terminal are connected by way of a transmission line so as to allow communication, the program causing a computer of the server to execute a first process for sequentially distributing a plurality of sets of identical moving picture image data with prescribed time differences to the client terminal; and causing a computer of the client terminal to execute a second process for, at the time of handover that occurs when moving from the current radio area to another neighboring radio area, receiving over a prescribed interval the plurality of sets of identical moving picture image data having the prescribed time differences, and selecting necessary data from the received moving picture image data to reconstruct one set of moving picture image data.

The second program of the present invention is a program that is used in a server that is connected so as to allow communication by way of a transmission line to a client terminal that moves among a plurality of radio areas; the second program causing the computer of the server to execute: a first process for generating a plurality of sets of identical encoded image data in which identical image data are encoded; a second process for sequentially transmitting on the transmission line the plurality of sets of identical encoded image data that have been generated in the first process with prescribed time differences; and a third process for carrying out prescribed control setting on the transmission line such that, at the time of handover that occurs when the client terminal moves from a current radio area to another neighboring radio area, the plurality of sets of identical encoded image data having the prescribed time differences that have been transmitted in the second process are received in the client terminal over a prescribed interval.

The third program of the present invention is a program that is used in a client terminal that is connected so as to allow communication by way of a transmission line to a server that sequentially distributes, with prescribed time differences, a plurality of sets of identical encoded image data in which an identical image has been encoded; the program causing a computer of the client terminal to execute: a process for, at the time of handover that occurs when moving from a current radio area to another neighboring radio area, receiving over a prescribed interval the plurality of sets of identical encoded image having the prescribed time differences that have been distributed from the server; and a process for selecting necessary data from the plurality of sets of identical encoded image data having the prescribed time differences that have been received over a prescribed interval to reconstruct one set of encoded image data.

In the image data communication system, the image data distribution device, the image data reception device, the image data communication method, and the programs of the present invention according to the foregoing description, a plurality of sets of identical moving picture image data (or a plurality of sets of identical encoded image data) having prescribed time differences are received over a prescribed interval at the time of handover. Necessary data are then selected from this plurality of sets of identical moving picture image data (or this plurality of sets of identical encoded image data) having the prescribed time differences that have been received over the prescribed interval to reconstruct one set of moving picture image data (or encoded image data). A more specific explanation of this reconstruction follows below.

As the plurality of sets of identical moving picture image data having prescribed time differences, two sets of moving picture image data A and B are considered. Moving picture image data A is composed of the n frames $A1, A2, \ldots, A(n-1)$, An; the frames being sequentially transmitted in that order. Moving picture image data B is composed of the n frames B1, B2, ..., B(n−1), Bn; the frames being sequentially transmitted in that order, but the transmission of this moving picture image data B is assumed to be delayed by five frames with respect to moving picture image data A. Given these conditions, during a prescribed time interval in which frames A11-A21 of moving picture image data A are received, frames B5-B15 are received for moving picture image data B. If, during the prescribed time interval, the three frames A12-A14 of moving picture image data A are lost due to a handover interval, the three frames B6-B9 of moving picture image data B will also be lost. As a result, during the prescribed time interval, frames A1 and A15-A21 of moving picture image data A are received, and frames B5 and B10-B15 of moving picture image data B are received. In this case, the three frames B12-B14 correspond to the three frames A12-A14 that were lost during the handover interval, and the lost frames of moving picture image data A can be compensated by these three frames B12-B14. By carrying out reconstruction in this manner, the frames that were lost during the handover interval are compensated.

Here, the above-described moving picture image data A and B are composed of m image data packets: image data packets A1, A2, ..., A(m−1), Am and image data packets B1, B2, ..., B(m−1), Bm in which the same points of the same frames of moving picture image data have been encoded. In the following explanation, the above-described frames may be image data packets.

In the above-described reconstruction, moving picture image data B are required only in a prescribed interval and normally are not necessary. As a result, control can be implemented such that during normal operation, moving picture image data B are not received if network resources are insufficient.

According to present invention as described hereinabove, lost data can be compensated by means of reconstruction despite the occurrence of handover, and degradation in image quality can therefore be suppressed to a minimum.

Further, because received data are decoded after the above-described reconstruction, the need for decoding a plurality of sets of image data can be eliminated, and any increases in the amount of computation required for decoding can therefore be suppressed to a low level.

In addition, eliminating causes of insufficiency of network resources can provide stable image data communication.

BEST MODE FOR CARRYING OUT THE INVENTION

The following explanation regards an embodiment of the present invention with reference to the accompanying figures.

The principal components of the image data communication system that is an embodiment of the present invention include an image data distribution device and an image data reception device, which is a mobile communication terminal (client terminal) connected by way of a mobile communication network to at least the image data distribution device. The image data distribution device transmits to the image data reception device a plurality of sets of identical moving picture image data having prescribed time differences. The image data reception device, at least at the time of handover, receives over a prescribed interval the plurality of sets of identical moving picture image data having the prescribed time differences from the image data distribution device, and selects necessary data from these moving picture image data that have been received to reconstruct one set of moving picture image data. By means of this reconstruction, image data that were lost during the handover time interval can be compensated.

The following explanation regards working examples 1-6 of actual constructions of the image data communication system according to the present embodiment.

WORKING EXAMPLE 1

Figure 1:
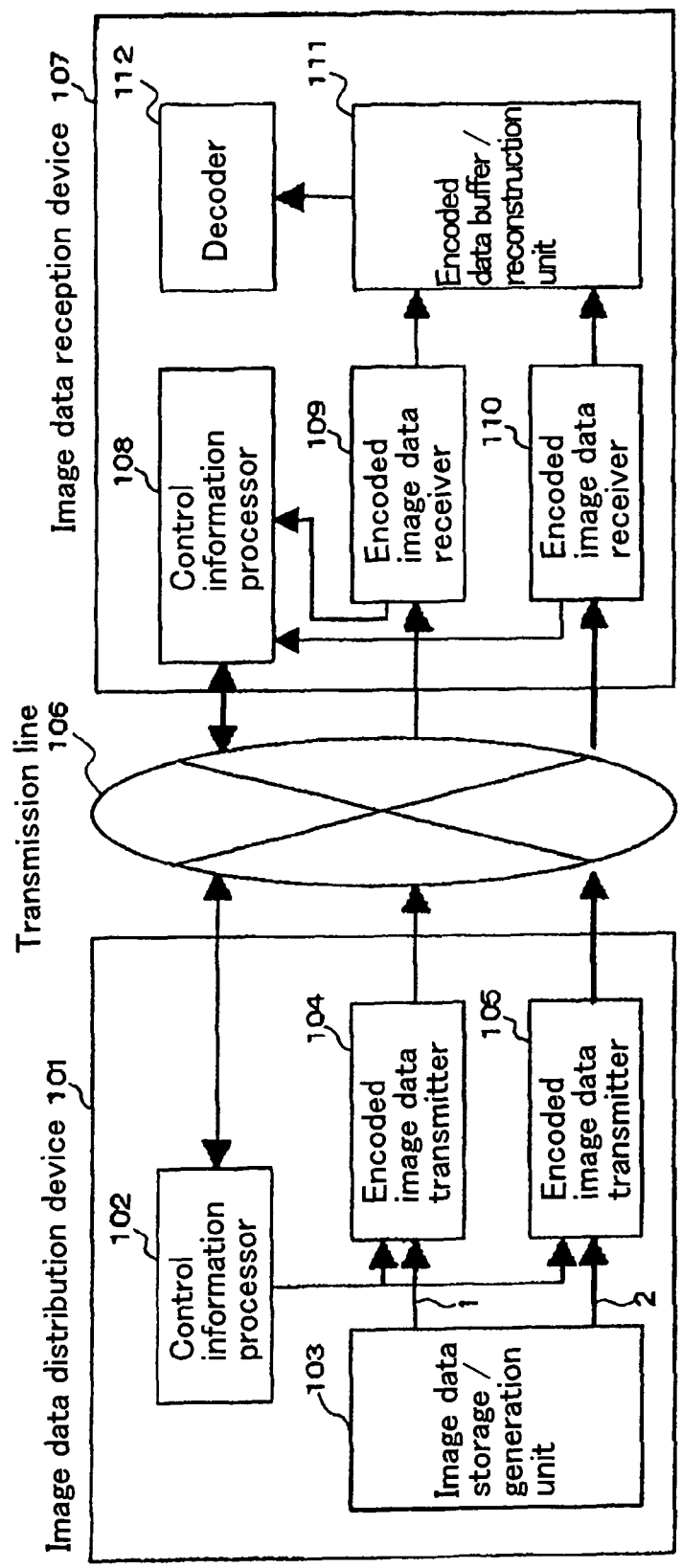
FIG. 1 is a block diagram showing a schematic configuration of the image data communication system that is the first working example of the present invention.

FIG. 1 shows a schematic configuration of the image data communication system that is the first working example of the present invention. In this image data communication system, image data distribution device 101 and image data reception device 107 are connected together so as to allow communication by way of transmission line 106, in which an IP network is constructed on a radio physical layer.

Image data distribution device 101 uses UDP (User Datagram Protocol)/IP, which is one Internet standard protocol, to distribute encoded image data to image data reception device 107 and is made up from: control information processor 102, image data storage/generation unit 103, and encoded image data transmitters 104 and 105.

Image data storage/generation unit 103 encodes image data that have been stored in advance, or encodes image data that are supplied from the outside in real time and generates encoded image data 1 and 2. These encoded image data 1 and 2 that have been generated are supplied to encoded image data transmitters 104 and 105, respectively. Encoded image data 1 and 2 are sets of identical encoded data that have undergone high-efficiency compression, of which the MPEG standard is representative.

Encoded image data transmitters 104 and 105 transmit onto transmission line 106 encoded image data 1 and 2 that have been supplied from image data storage/generation unit 103 in respectively different sessions having a prescribed time difference. In the present embodiment, a time difference is conferred such that the transmission of encoded image data 2 from encoded image data transmitter 105 is delayed by a prescribed time interval with respect to the transmission of encoded image data 1 from encoded image data transmitter 104. Here, the prescribed time difference is a time difference that allows the reconstruction that is to be described hereinbelow. In this case, each of encoded image data transmitters 104 and 105 has the capability to add, to the encoded image data, information (for example, an RTP header) that corresponds to RTP (Real Time Transport Protocol) so as to allow the selection of necessary data from the received data and the switching of the order of the data when image data reception device 107 receives both sets of encoded image data 1 and 2 and reconstructs data.

During normal operation, control information processor 102 sets the routing priority and/or power control on the radio transmission lines such that, encoded image data 1 are received with priority in image data reception device 107; but at the time of handover, i.e., the time interval from the reception of notification of the start of handover from image data reception device 107 until the reception of notification of the end of handover, control information processor 102 sets the routing priority and/or power control on the radio transmission line such that encoded image data 1 and 2 are both received in image data reception device 107. An already existing method can be applied in the setting of this routing priority and power control on the radio transmission line.

Image data reception device 107 is a client terminal that is connected to a radio IP network and is of a configuration that includes control information processor 108, encoded image data receivers 109 and 110, encoded data buffer/reconstruction unit 111, and decoder 112.

Encoded image data receiver 109 receives encoded image data 1 that are transmitted from encoded image data transmitter 104 and supplies the reception level to control information processor 108. Encoded image data receiver 110 receives encoded image data 2 that are transmitted from encoded image data transmitter 105 and supplies the reception level to control information processor 108. The encoded image data that are received by means of these encoded image data receivers 109 and 110 are supplied to encoded data buffer/reconstruction unit 111.

Control information processor 108 determines the start of handover when the reception level of encoded image data 1 that are supplied from encoded image data receiver 109 makes a transition from a state of being at least a prescribed level to a state of being below a prescribed level, and transmits start notification (or a request to alter settings) to control information processor 102. Control information processor 108 further determines the end of handover when the reception level of encoded image data 1 and 2 that are supplied from encoded image data receiver 109 makes a transition from a state of being below a prescribed level to a state of being above a prescribed level, and after the passage of a prescribed time interval from the end, transmits notification of the end of handover (or a request to alter settings) to control information processor 102.

During normal operation, encoded data buffer/reconstruction unit 111 simply supplies the moving picture image encoded data that are received from encoded image data receiver 109 to decoder 112. However, when encoded image data 1 and 2 are both received in encoded image data receivers 109 and 110, encoded data buffer/reconstruction unit 111 selects necessary data from received encoded image data 1 and 2 based on, for example, functions that are equivalent to RTP, the received sessions, and the degree of compression of the image data, uses the selected data to reconstruct one set of image data, and supplies this reconstructed image data to decoder 112. Thus, even when both encoded image data 1 and 2 are being received, only one set of image data is decoded, and the burden upon the decoding process of decoder 112 is therefore not increased. Decoder 112 is a known device for decoding encoded image data 1 and 2 that are received from image data distribution device 101.

The following explanation regards a specific example of the operations of the image data communication system of the present working example.

The explanation first regards normal operations, i.e., operations during the time image data reception device 107 is moving within a single radio area (cell). In image data distribution device 101, encoded image data transmitter 104 transmits encoded image data 1, and encoded image data transmitter 105 transmits encoded image data 2 that are identical to encoded image data 1 delayed from the transmission of encoded image data 1 by a prescribed time interval.

During the transmission of encoded image data 1 and 2, control information processor 102 makes settings such that encoded image data 1 are routed with higher priority than encoded image data 2 on transmission line 106, and/or such that encoded image data 1 are transmitted at higher power than encoded image data 2 on the radio transmission line of transmission line 106. By making these settings, when the resources of transmission line 106 are insufficient, priority is given to delivering encoded image data 1 to image data reception device 107 while encoded image data 2 are discarded on transmission line 106, whereby overflow due to excessive traffic on transmission line 106 is suppressed.

In image data reception device 107, as a minimum, encoded image data 1 are received in encoded image data receiver 109. These encoded image data 1 that are received are temporarily stored in encoded data buffer/reconstruction unit 111 and then supplied to decoder 112 and there subjected to a decoding process.

The following explanation regards operations at the time of handover, i.e., when image data reception device 107 moves from a current radio area to another neighboring radio area while receiving encoded image data 1.

The reception level of encoded image data 1 falls as image data reception device 107 moves away from the base station of the current radio area. Control information processor 108 sends notification of the start of handover to image data distribution device 101 when the reception level of encoded image data 1 that are supplied from encoded image data receiver 109 falls below a prescribed level.

Upon reception of the handover start notification in image data distribution device 101, control information processor 102 sets the routing priority and/or the power control on the radio transmission line such that encoded image data 1 and 2 are both received in image data reception device 107, whereby identical encoded image data 1 and 2 are both received with a prescribed time difference in image data reception device 107 after the transmission of the handover start notification.

When the distance from the base station of the current radio area increases further, the reception level of encoded image data 1 and 2 in image data reception device 107 falls even more until reception is lost. The point in time at which the reception of encoded image data 1 and 2 is lost is the start of the handover interval. On the other hand, as image data reception device 107 approaches the base station in another radio area that is the destination of movement, the reception level of encoded image data 1 and 2 in image data reception device 107 gradually increases until the reception of encoded image data 1 and 2 becomes possible. The point in time at which the reception of encoded image data 1 and 2 becomes possible is the end of the handover interval. During the handover interval, the reception of both of encoded image data 1 and 2 in image data reception device 107 becomes impossible, and data are therefore lost.

When the reception of encoded image data 1 and 2 becomes possible and the reception level of encoded image data 1 and 2 exceeds a prescribed level, control information processor 108 in image data reception device 107 transmits notification of the end of handover to image data distribution device 101 after the passage of a prescribed time interval from the time at which the reception level exceeded a prescribed level.

Encoded image data 1 and 2 are both received in image data reception device 107 during a prescribed interval after the end of the handover interval. All or a portion of the data of encoded image data 1 that were lost during the handover interval are contained in encoded image data 2 that are received during this prescribed interval. Encoded data buffer/reconstruction unit 111 selects from received encoded image data 2 the data that correspond to the lost data of encoded image data 1 and reconstructs one set of image data by correctly ordering this selected data and encoded image data 1 that have been received. By means of this reconstruction, all or a portion of the lost data of encoded image data 1 are compensated. These reconstructed image data are supplied to decoder 112 and there decoded.

After the above-described prescribed interval, the handover end notification is received in image data distribution device 101. Control information processor 102 then makes settings such that encoded image data 1 are routed with higher priority on transmission line 106 than encoded image data 2 and/or such that encoded image data 1 are transmitted at higher power than encoded image data 2 on the radio transmission line of transmission line 106. By means of these settings, operation is realized in image data reception device 107 that is the same as during normal operation described above.

Figure 2:
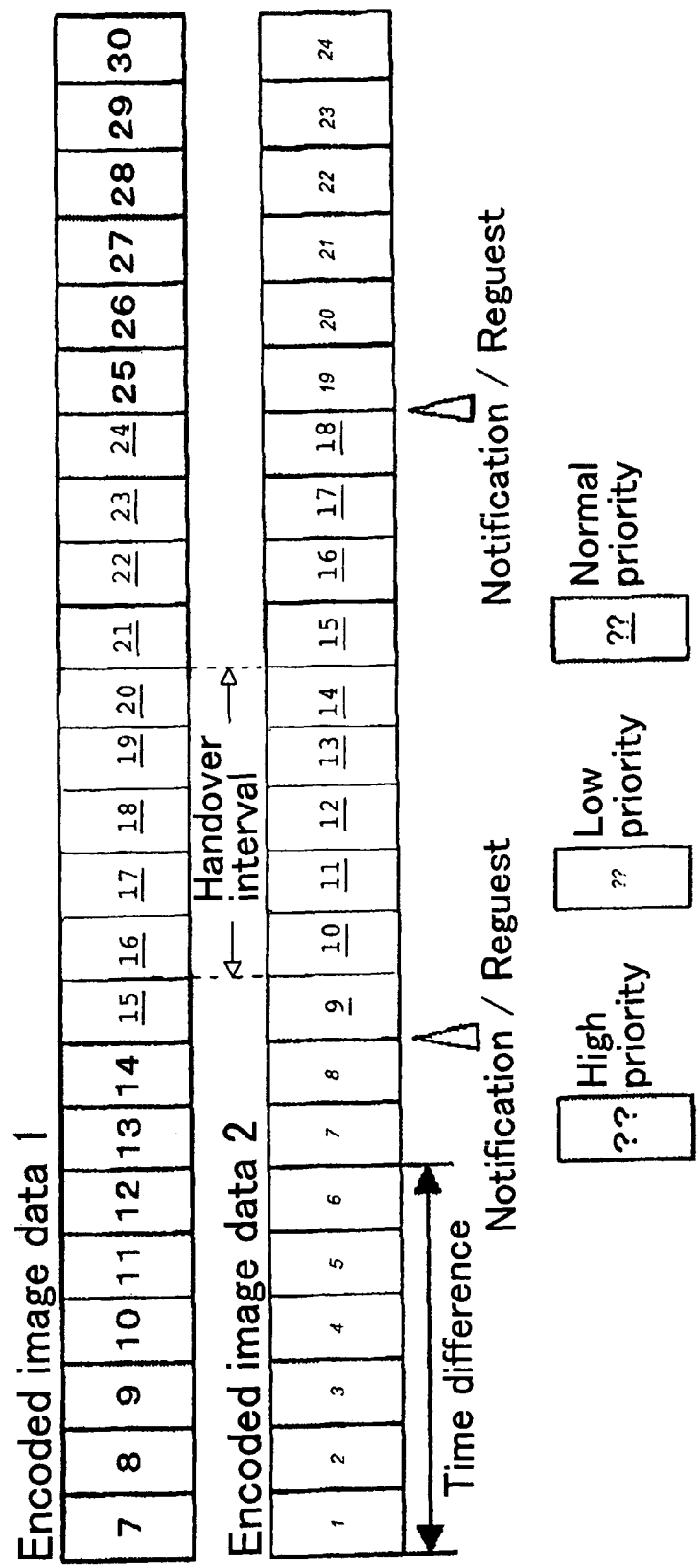
FIG. 2 is a schematic view showing an actual example of the reconstruction of image data at the time of handover in the image data communication system shown in FIG. 1.

FIG. 2 shows an actual example of the reconstruction of image data at the above-described time of handover. The data of the $7^{th}$ frame, $8^{th}$ frame, ..., $30^{th}$ frame are transmitted in that order as encoded image data 1, and the data of the $1^{st}$ frame, $2^{nd}$ frame, ... $24^{th}$ frame are transmitted in that order as encoded image data 2, a time difference of six frames existing between these encoded image data 1 and 2. Of encoded image data 1, the $7^{th}$-$14^{th}$ and $25^{th}$-$30^{th}$ frames (frames shown in bold print) are portions that have been set to high priority, and the $15^{th}$-$24^{th}$ frames (frames shown in lighter print) are portions that have been set such that the priority is lower. In encoded image data 2, the $1^{st}$-$8^{th}$ frames and the $19^{th}$-$24^{th}$ frames (frames shown in small print) are frames that have been set to low priority, and the $9^{th}$-$18^{th}$ frames (frames shown with underlined characters) are portions that have been set to normal priority.

In the example of FIG. 2, image data reception device 107 transmits a handover start notification to image data distribution device 101 at the time of receiving the $14^{th}$ frame of encoded image data 1, and transmits a handover end notification to image data distribution device 101 at the time of receiving the $24^{th}$ frame of encoded image data 1. Before transmission of the handover start notification in image data reception device 107, the data of the $7^{th}$-$14^{th}$ frames of encoded image data 1 are received with priority, and the data of the $25^{th}$-$30^{th}$ frames of encoded image data 1 are received with priority after the transmission of handover end notification.

In image data distribution device 101, priority and/or power control is set such that encoded image data 1 and 2 are both received in image data reception device 107 in the interval from the reception of the handover start notification until the reception of the handover end notification. As a result, after the transmission of the handover start notification, priority is lowered for encoded image data 1 from the $15^{th}$ frame, and normal priority is set for encoded image data 2 from the $9^{th}$ frame, whereby both sets of encoded image data are received in image data reception device 107 from the $15^{th}$ frame for encoded image data 1 and from the $9^{th}$ frame for encoded image data 2.

The interval of the $16^{th}$-$20^{th}$ frames of encoded image data 1 and the $10^{th}$-$14^{th}$ frames of encoded image data 2 is the handover interval, and during this handover interval, neither of encoded image data 1 and 2 can be received in image data reception device 107. As a result, during this handover interval, the data of the $16^{th}$ to $20^{th}$ frames are lost for encoded image data 1 and the data of the $10^{th}$ to $14^{th}$ frames are lost for encoded image data 2.

After the end of the handover interval and until the handover end notification, data are sequentially received in image data reception device 107 from the $21^{st}$ frame for encoded image data 1 and from the $15^{th}$ frame for encoded image data 2. In this way, during the interval from the handover start notification until the handover end notification, the data of the $15^{th}$ and $21^{st}$-$24^{th}$ frames for encoded image data 1 and the data of the $9^{th}$ and $15^{th}$-$18^{th}$ frames for encoded image data 2 are both received in image data reception device 107. The reconstruction of image data is then carried out from the $21^{st}$ to the $24^{th}$ frames of encoded image data 1 and the $15^{th}$ to the $18^{th}$ frames of encoded image data 2 that have been received. Thus, of the $16^{th}$ to $20^{th}$ frames of encoded image data 1 that were lost during the handover interval, the $16^{th}$ to $18^{th}$ lost frames are compensated.

WORKING EXAMPLE 2

Figure 3:
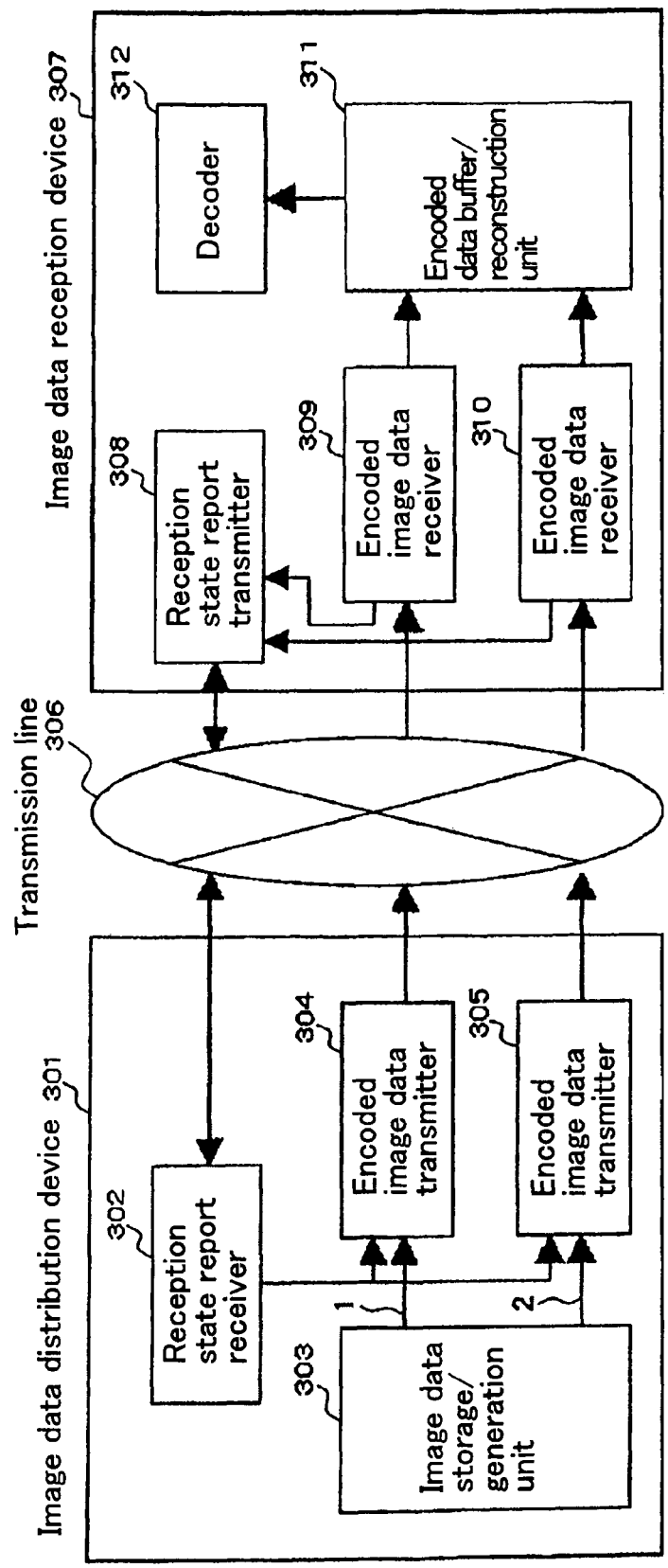
FIG. 3 is a block diagram showing a schematic configuration of the image data communication system that is the second working example of the present invention.

FIG. 3 shows the schematic configuration of the image data communication system that is the second working example of the present invention. In this image data communication system, image data distribution device 301 and image data reception device 307 are connected so as to allow communication with each other by way of transmission line 306, in which an IP network is constructed on a radio physical layer.

Image data distribution device 301 uses UDP/IP to distribute encoded image data to image data reception device 307, and is of a configuration that includes reception state report receiver 302, image data storage/generation unit 303, and encoded image data transmitters 304 and 305. Image data storage/generation unit 303 and encoded image data transmitters 304 and 305 are basically the same as image data storage/generation unit 103 and encoded image data transmitters 104 and 105 that are shown in FIG. 1.

Reception state report receiver 302 determines the start and end of handover in image data reception device 307 based on reception state reports from image data reception device 307. In addition, reception state report receiver 302 sets the routing priority and/or the power control on the radio transmission line such that, during normal operation, encoded image data 1 are received with priority in image data reception device 307, and sets the routing priority and/or power control on the radio transmission line such that encoded image data 1 and 2 are both received in image data reception device 307 at the time of handover, i.e., during the interval from the start until the end of handover. An already known method can be applied in this setting of the routing priority and power control on the radio transmission line.

Image data reception device 307 is a client terminal that is connected to a radio IP network, and is of a configuration that includes: reception state report transmitter 308, encoded image data receivers 309 and 310, encoded data buffer/reconstruction unit 311, and decoder 312. Encoded data buffer/reconstruction unit 311 and decoder 312 are basically identical to encoded data buffer/reconstruction unit 111 and decoder 112 that are shown in FIG. 1.

Encoded image data receiver 309 receives encoded image data 1 that are transmitted from encoded image data transmitter 304, and encoded image data receiver 310 receives encoded image data 2 that are transmitted from encoded image data transmitter 305. Encoded image data 1 and 2 that are received by these encoded image data receivers 309 and 310 are supplied to encoded data buffer/reconstruction unit 311.

Reception state report transmitter 308: collects RR (Receiver Reports) of RTCP (RTP Control Protocol) or information that is equivalent to these reports for encoded image data 1 and 2 that are received from encoded image data receivers 309 and 310, respectively, collecting this information at a spacing based on RTCP specifications, fixed spacing, or spacing that depends on the degree of change in past information, the spacing becoming shorter when change is great and longer when change is small; derives statistics such as the loss factor from the collected information; and transmits this information as reception state reports to image data distribution device 301.

The following explanation regards the actual operation of the image data communication system of the present working example.

Explanation first regards normal operation, i.e., operation during the time that image data reception device 307 moves within a single radio area (cell). When encoded image data 1 and 2 are transmitted during normal operation, reception state report receiver 302 sets the routing priority and/or the power control on radio transmission line such that encoded image data 1 is received with priority in image data reception device 307. By means of these settings, when the resources of transmission line 306 are insufficient, priority is given to the arrival of encoded image data 1 in image data reception device 307, and encoded image data 2 are abandoned on transmission line 306. In this way, overflow on transmission line 306 due to excessive traffic is suppressed.

In image data reception device 307, at least encoded image data 1 is received in encoded image data receiver 309. These received encoded image data 1 are temporarily stored in encoded data buffer/reconstruction unit 311 and then supplied to decoder 312 where the encoded data undergo decoding.

Explanation next regards operation at the time of handover, i.e., when image data reception device 307 moves from a current radio area to another neighboring radio area while receiving encoded image data.

With increasing distance from the base station of the current radio area, the reception state of encoded image data 1 in image data reception device 307 deteriorates and the loss factor increases. When the loss factor increases, the statistical value of the loss factor of encoded image data 1, which is the reception state report from reception state report transmitter 308, exceeds a prescribed value.

When the statistical value of the loss factor of encoded image data 1 exceeds a prescribed value, reception state report receiver 302 in image data distribution device 301 determines the start of handover and sets the routing priority and/or the power control on the radio transmission line such that encoded image data 1 and 2 are both received in image data reception device 307. More specifically, reception state report receiver 302 implements settings to lower the routing priority and/or transmission power on the transmission line for encoded image data 1 and to raise the routing priority and/or transmission power on the transmission line for encoded image data 2, whereby identical encoded image data 1 and 2 having a prescribed time difference are both received in image data reception device 307 after the start of handover.

With further increase of the distance from the base station of the current radio area, the reception state of encoded image data 1 and 2 in image data reception device 307 further deteriorates until reception becomes impossible. The handover interval begins at the point in time that reception of encoded image data 1 and 2 becomes impossible. As image data reception device 307 approaches the base station in the other radio area that is the destination of movement, the reception state of encoded image data 1 and 2 in image data reception device 307 gradually improves to finally enable reception of encoded image data 1 and 2. This point in time at which the reception of encoded image data 1 and 2 becomes possible is the end of the handover interval. During the handover interval, neither of encoded image data 1 and 2 can be received in image data reception device 307 and data are lost.

When reception of encoded image data 1 and 2 becomes possible, the statistical value of the loss factor of encoded image data 1 and 2, which is the reception state report from reception state report transmitter 308, falls below a prescribed value. In image data distribution device 301, reception state report receiver 302 determines the end of handover after the passage of a prescribed time interval from the time at which the statistical value falls below a prescribed value, and returns the routing priority and/or power control on the radio transmission line to the normal settings such that encoded image data 1 are received with priority in image data reception device 307.

During the prescribed interval following the end of the handover interval, encoded image data 1 and 2 are both received in image data reception device 307. Encoded image data 2 that are received during this prescribed interval contain all or a portion of the data of encoded image data 1 that were lost during the handover interval. Encoded data buffer/reconstruction unit 311 selects data that correspond to the lost data of encoded image data 1 from encoded image data 2 that were received and correctly orders the selected data and the received encoded image data 1 to reconstruct one set of image data. By means of this reconstruction, all or a portion of the lost data of encoded image data 1 are compensated. Image data that are reconstructed in this way are supplied to decoder 312 and there decoded.

After the above-described prescribed interval, operation is carried out that is the same as the above-described normal operation in image data reception device.

Figure 4:
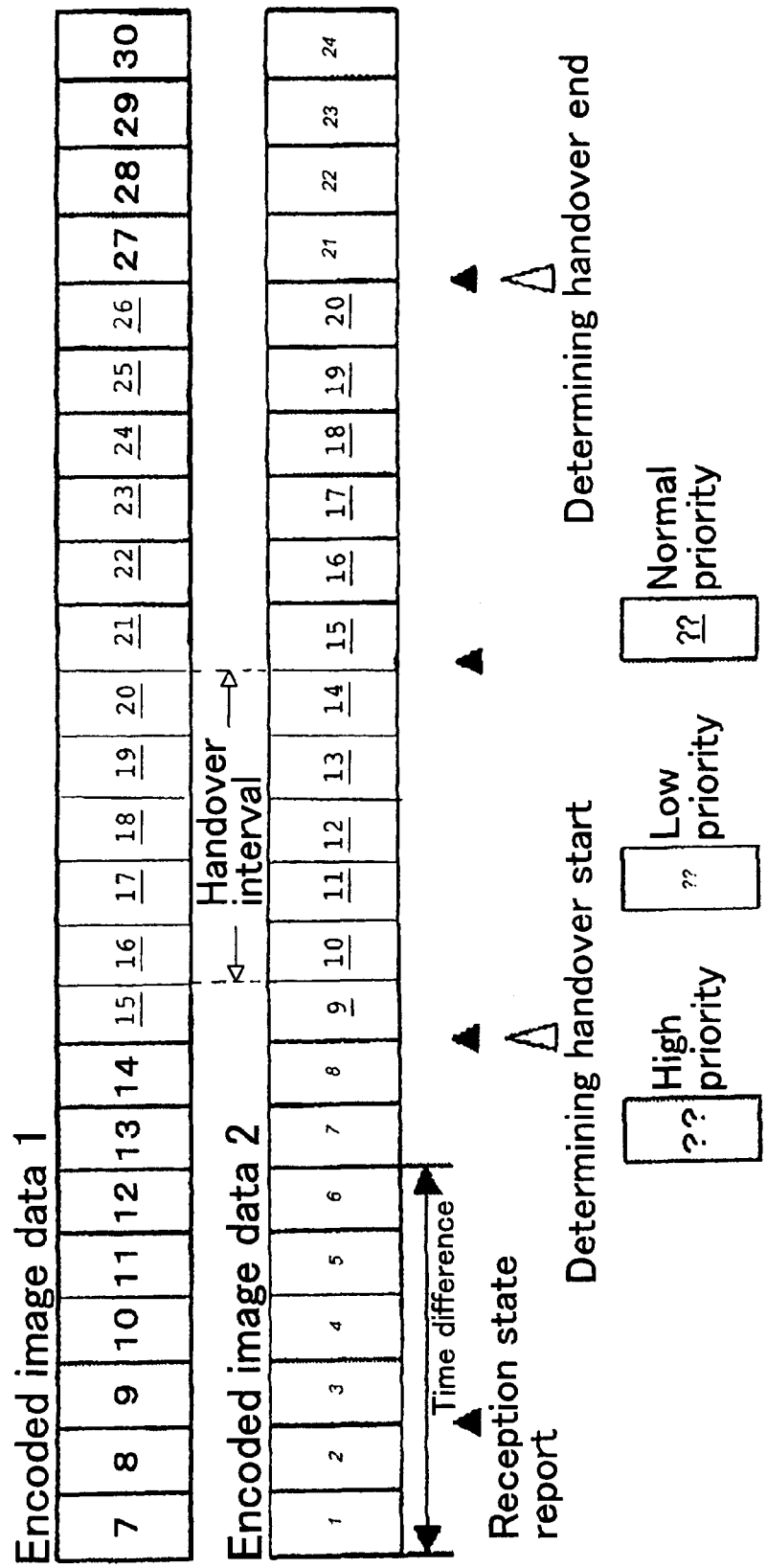
FIG. 4 is a schematic view showing an actual example of the reconstruction of image data at the time of handover in the image data communication system shown in FIG. 3.

FIG. 4 shows an actual example of the reconstruction of image data at the above-described time of handover. The data of the $7^{th}$ frame, $8^{th}$ frame, . . . , $30^{th}$ frame are transmitted in order as encoded image data 1, and the data of the $1^{st}$ frame, $2^{nd}$ frame, . . . , $24^{th}$ frame are transmitted in order as encoded image data 2, with a time difference of six frames between encoded image data 1 and 2. In encoded image data 1, the $7^{th}$-$14^{th}$ frames and $27^{th}$-$30^{th}$ frames (the portions indicated in bold print) are the portions that are set to high priority, and the $15^{th}$-$26^{th}$ frames (the portion indicated by light print) is the portion in which the priority is set lower. In encoded image data 2, the $1^{st}$-$8^{th}$ frames and the $21^{st}$-$24^{th}$ frames (the portions indicated in small characters) are the portions that are set to low priority, and the $9^{th}$-$20^{th}$ frames (the portion that is indicated by underlining) is the portion set to normal priority.

In the example of FIG. 4, image data reception device 307 transmits reception state reports to image data distribution device 301 every six frames. Image data reception device 301 determines the start of handover at the time of receiving the $14^{th}$ frame of encoded image data 1, and determines the end of handover at the time of receiving the $26^{th}$ frame of encoded image data 1. In image data reception device 307, the data of the $7^{th}$-$14^{th}$ frames of encoded image data 1 are received with priority before the start of handover, and the data of the $27^{th}$-$30^{th}$ frames of encoded image data 1 are received with priority after the end of handover.

During the interval from the start and until the end of handover, the settings of priority and/or power control are implemented such that encoded image data 1 and 2 are both received in image data reception device 307. Thus, after the start of handover, priority is lowered for encoded image data 1 from the $15^{th}$ frame, and priority is normal from the $9^{th}$ frame for encoded image data 2. In this way, both sets of image data are received in image data reception device 307 from the $15^{th}$ frame for encoded image data 1 and from the $9^{th}$ frame for encoded image data 2.

The interval of the $16^{th}$ to the $20^{th}$ frames of encoded image data 1 (the $10^{th}$ to the $14^{th}$ frames in encoded image data 2) is within the handover interval, and neither of encoded image data 1 and 2 can be received in image data reception device 307 during this handover interval. As a result, during this handover interval, the data of the $16^{th}$ to $20^{th}$ frames are lost for encoded image data 1 and the data of the $10^{th}$ to $14^{th}$ frames are lost for encoded image data 2.

During the interval following the end of the handover interval and up to the end of handover, encoded image data 1 and 2 are sequentially received in image data reception device 307 from the $21^{st}$ frame for encoded image data 1 and from the $15^{th}$ frame for encoded image data 2. In this way, the data of the $15^{th}$ and $21^{st}$-$26^{th}$ frames of encoded image data 1 and the data of the $9^{th}$ and $15^{th}$-$20^{th}$ frames of encoded image data 2 are both received in image data reception device 307 during the interval from the start and until the end of handover. The reconstruction of the image data is then carried out from the $21^{st}$-$26^{th}$ frames of encoded image data 1 and the $15^{th}$-$20^{th}$ frames of encoded image data 2 that have been received, whereby the $16^{th}$-$20^{th}$ frames of encoded image data 1 that were lost during the handover interval are compensated by the $16^{th}$-$20^{th}$ frames of encoded image data 2.

WORKING EXAMPLE 3

The image data communication system of the present working example is of the same configuration as the system shown in FIG. 1, but a portion of the operation differs. More specifically, the operation of the present working example differs from the system of FIG. 1 in that, in image data distribution device 101, encoded image data 2 are transmitted from encoded image data transmitter 105 only at the time of handover under the control of control information processor 102. The operation is otherwise identical to that of the system of FIG. 1.

The following explanation regards the actual operation of the image data communication system of the present working example.

Normally, in image data distribution device 101, encoded image data 1 are transmitted from encoded image data transmitter 104 but encoded image data 2 are not transmitted from encoded image data transmitter 105. In image data reception device 107, only encoded image data 1 are received in encoded image data receiver 109. These received encoded image data 1 are temporarily stored in encoded data buffer/reconstruction unit 111 and then supplied to decoder 112 where the data undergo the decoding process.

The following explanation regards the operation at the time of handover.

In image data reception device 107, the reception level of encoded image data 1 falls as distance increases from the base station of the current radio area. When the reception level of encoded image data 1 that are supplied from encoded image data receiver 109 falls below a prescribed level, control information processor 108 transmits a handover start notification to image data distribution device 101. In place of this handover start notification, or together with this handover start notification, control information processor 108 may submit a request to image data distribution device 101 such that encoded image data 1 are switched to encoded image data of a low bit rate and the distribution of encoded image data 2 begins. In this case, control information processor 108 may submit a request for resetting of priority routing on transmission line 106 and/or the power control on the radio transmission line of transmission line 106.

In image data distribution device 101, upon reception of the handover start notification (and/or a request to change to a low bit rate and begin distribution of encoded image data 2), control information processor 102 both switches encoded image data 1 that are transmitted from encoded image data transmitter 104 to encoded image data of a lower bit rate and causes transmission of encoded image data 2 from encoded image data transmitter 105. At this time, control information processor 102 may also reset priority routing on transmission line 106 or the power control on the radio transmission line of transmission line 106 such that encoded image data 1 and 2 are both received in image data reception device 107.

As the distance from the base station of the current radio area increases further, the reception level of encoded image data 1 and 2 in image data reception device 107 falls further until reception is eventually lost. The handover interval begins at the point in time that the reception of encoded image data 1 and 2 becomes impossible. As image data reception device 107 approaches the base station in another radio area that is the destination of movement, the reception level of encoded image data 1 and 2 in image data reception device 107 gradually increases, until reception of encoded image data 1 and 2 finally becomes possible. This point in time at which the reception of encoded image data 1 and 2 becomes possible is the end of the handover interval. During the handover interval, neither of encoded image data 1 and 2 can be received in image data reception device 107 and data are consequently lost.

When the reception of encoded image data 1 and 2 becomes possible and the reception level of encoded image data 1 and 2 exceeds a prescribed level, control information processor 108 in image data reception device 107 transmits a handover end notification to image data distribution device 101 after the passage of a prescribed time interval from the point in time at which the reception level of both encoded image data 1 and 2 exceeds a prescribed level. In place of this handover end notification, or together with this handover end notification, control information processor 108 may also submit a request to image data distribution device 101 to halt distribution of encoded image data 2 and to switch to encoded image data of the normal bit rate of encoded image data 1. In addition, if the routing priority on transmission line 106 and/or the transmission power control on radio transmission lines were changed at the time of the start of handover, control information processor 108 submits a request to image data distribution device 101 such that these settings are returned to the original state during normal operation.

During a prescribed interval following the completion of the handover interval, encoded image data 1 and 2 are both received in image data reception device 107. Encoded image data 2 that are received during this prescribed interval include all or a portion of the data of encoded image data 1 that were lost during the handover interval. Encoded data buffer/reconstruction unit 111 selects data that correspond to the lost data of encoded image data 1 from the encoded image data 2 that have been received and correctly orders this selected data and encoded image data 1 that have been received to reconstruct one set of image data. By means of this reconstruction, all or a portion of the lost data of encoded image data 1 are compensated. Image data that are thus reconstructed are then supplied to decoder 112 and there undergo decoding.

After the above-described prescribed interval, a handover end notification (and/or a request to change to the normal bit rate and halt the distribution of encoded image data 2) is received in image data distribution device 101. Control information processor 102 then switches encoded image data 1 of the low bit rate that were transmitted from encoded image data transmitter 104 to encoded image data of the normal bit rate, and further, halts the distribution of encoded image data 2 from encoded image data transmitter 104, whereby the same operation as in the above-described normal operation is carried out.

Figure 5:
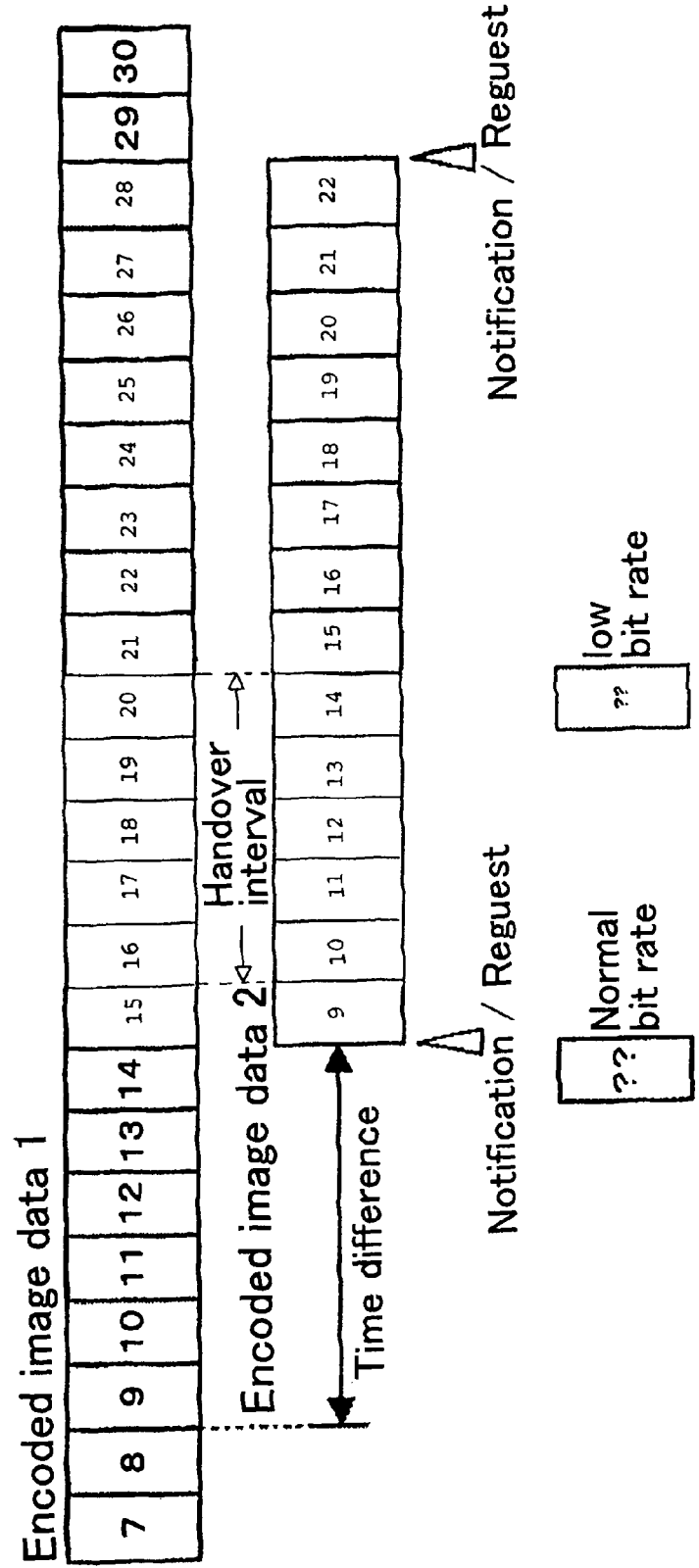
FIG. 5 is a schematic view showing an actual example of the reconstruction of image data at the time of handover in the image data communication system that is the third working example of the present invention.

FIG. 5 shows an actual example of the reconstruction of image data at the time of handover described above. The data of the $7^{th}$ frame, $8^{th}$ frame, . . . , $30^{th}$ frame are transmitted in order as encoded image data 1, and at the time of handover, the data of the $9^{th}$ frame, $10^{th}$ frame, . . . , $22^{nd}$ frame are transmitted in order as encoded image data 2 as well as encoded image data 1. A time difference of six frames exists between these encoded image data 1 and 2. In encoded image data 1, the $7^{th}$-$14^{th}$ frames and the $25^{th}$-$30^{th}$ frames (portions indicated by bold print) are set to be transmitted at the normal bit rate; and the $15^{th}$-$24^{th}$ frames (the portion indicated in light print) is the portion set to be transmitted at low bit rate. In encoded image data 2, the $9^{th}$-$22^{nd}$ frames (the portion indicated by light print) is the portion set to be transmitted at a low bit rate.

In the example of FIG. 5, image data reception device 107 transmits to image data distribution device 101 a handover start notification and/or a request for the change to the low bit rate and the start of distribution of encoded image data 2 (hereinbelow referred to as simply "handover start notification/request") at the time of reception of the $14^{th}$ frame of encoded image data 1, and at the time of reception of the $24^{th}$ frame of encoded image data 1, transmits to image data distribution device 101 a handover end notification and/or a request to change to the normal bit rate and halt the distribution of encoded image data 2 (hereinbelow referred to as simply "handover end notification/request").

In image data reception device 107, the data of the $7^{th}$-$14^{th}$ frames of encoded image data 1 are received before the transmission of the handover start notification/request, and the data of the $29^{th}$-$30^{th}$ frames of encoded image data 1 are received after the transmission of the handover end notification/request.

In the interval from the reception of the handover start notification/request and up to the reception of the handover end notification/request in image data distribution device 101, transmission is carried out sequentially at the low bit rate from the $15^{th}$ frame for encoded image data 1, and transmission is sequentially carried out from the $9^{th}$ frame for encoded image data 2. Both sets of image data are thus received in image data reception device 107 from the $15^{th}$ frame for encoded image data 1 and from the $9^{th}$ frame for encoded image data 2.

The interval from the $16^{th}$ to the $20^{th}$ frames of encoded image data 1 and from the $10^{th}$ to the $14^{th}$ frames of encoded image data 2 is the handover interval, and during this handover interval, neither of encoded image data 1 and 2 can be received in image data reception device 107. As a result, the data from the $16^{th}$ to the $20^{th}$ frames are lost for encoded image data 1 and the data from the $10^{th}$ the $14^{th}$ frames for encoded image data 2 are lost during this handover interval.

After the end of the handover interval and during the interval up to the handover end notification, data from the $21^{st}$ frame of encoded image data 1 and from the $15^{th}$ frame of encoded image data 2 are sequentially received in image data reception device 107. Thus, during the interval from the handover start notification until the handover end notification, data of the $15^{th}$ and the $21^{st}$-$28^{th}$ frames of encoded image data 1 and data of the $9^{th}$ and $15^{th}$-$22^{nd}$ frames of encoded image data 2 are both received in image data reception device 107. The $15^{th}$-$28^{th}$ frames are then selected from these encoded image data that have been received and shunted to the correct order to reconstruct the image data. In this way, the $16^{th}$ to $20^{th}$ frames of encoded image data 1 that were lost during the handover interval are compensated.

WORKING EXAMPLE 4

The image data communication system of the present working example is of the same configuration as the system shown in FIG. 3, but a portion of the operation is different. More specifically, the present working example differs from the system of FIG. 3 in that in image data distribution device 301, under the control of reception state report receiver 302, encoded image data 2 are transmitted from encoded image data transmitter 305 only at the time of handover. The operation is otherwise basically the same as in the system of FIG. 3.

The following explanation regards an actual example of the operation of the image data communication system of the present working example.

During normal operation, encoded image data 1 are transmitted from encoded image data transmitter 304 in image data distribution device 301, but encoded image data 2 are not transmitted from encoded image data transmitter 305. Only encoded image data 1 are received in encoded image data receiver 309 in image data reception device 307. These encoded image data 1 that are received are temporarily stored in encoded data buffer/reconstruction unit 311 and then supplied to decoder 112 and there decoded.

Explanation next regards the operation at the time of handover.

As the distance increases from the base station of the current radio area, the reception state of encoded image data 1 in image data reception device 307 deteriorates and the loss factor increases. When the loss factor reaches a high level, the statistic value of the loss factor of encoded image data 1, which is the reception state report from reception state report transmitter 308, exceeds a prescribed value.

When the statistic value of the loss factor of encoded image data 1 falls below a prescribed value, reception state report receiver 302 in image data distribution device 301 determines the start of handover and both switches encoded image data 1 that are transmitted from encoded image data transmitter 304 to encoded image data having a lower bit rate and causes the transmission of encoded image data 2 from encoded image data transmitter 305. At this time, reception state report receiver 302 may also implement resetting of priority routing on transmission line 306 and/or power control on the radio transmission lines of transmission line 306 such that encoded image data 1 and 2 are both received in image data reception device 307, whereby identical encoded image data 1 and 2 having a prescribed time difference are both received after the start of handover in image data reception device 307.

As the distance from the base station of the current radio area further increases, the reception state of encoded image data 1 and 2 in image data reception device 307 further deteriorates until reception becomes impossible. The point in time at which the reception of encoded image data 1 and 2 becomes impossible is the start of the handover interval. On the other hand, as image data reception device 307 approaches the base station in another radio area that is the destination of movement, the reception state of encoded image data 1 and 2 gradually improves in image data reception device 307 until eventually the reception of encoded image data 1 and 2 becomes possible. The point in time at which the reception of encoded image data 1 and 2 becomes possible is the end of the handover interval. During the handover interval, neither of encoded image data 1 and 2 can be received in image data reception device 307, and data are therefore lost.

When the reception of encoded image data 1 and 2 becomes possible, the statistical value of the loss factor of encoded image data 1 and 2, which is the reception state report from reception state report transmitter 308, falls below a prescribed value. Reception state report receiver 302 in image data distribution device 301 determines the end of handover after the passage of a prescribed time interval following the time at which the statistical value falls below the prescribed value, and then both switches encoded image data 1 that are being transmitted from encoded image data transmitter 304 from the low bit rate to the normal bit rate and halts the transmission of encoded image data 2 from encoded image data transmitter 305. At this time, if the routing priority on transmission line 306 and/or the transmission power control on radio transmission lines were changed at the time of determination of the start of handover, reception state report transmitter 308 returns these settings to the state of normal operation (the original state).

Encoded image data 1 and 2 are both received in image data reception device 307 during a prescribed interval following the end of the handover interval. Encoded image data 2 that are received during this prescribed interval contain all or a portion of the data of encoded image data 1 that were lost during the handover interval. Encoded data buffer/reconstruction unit 311 selects data that correspond to the lost data of encoded image data 1 from the encoded image data 2 that were received and correctly arranges the selected data with encoded image data 1 that were received to reconstruct one set of image data. By means of this reconstruction, all or a portion of the lost data of encoded image data 1 are compensated. Image data that have been reconstructed in this way are supplied to decoder 312 and there decoded.

After the above-described prescribed interval, the same operations are carried out as in the above-described normal operation.

Figure 6:
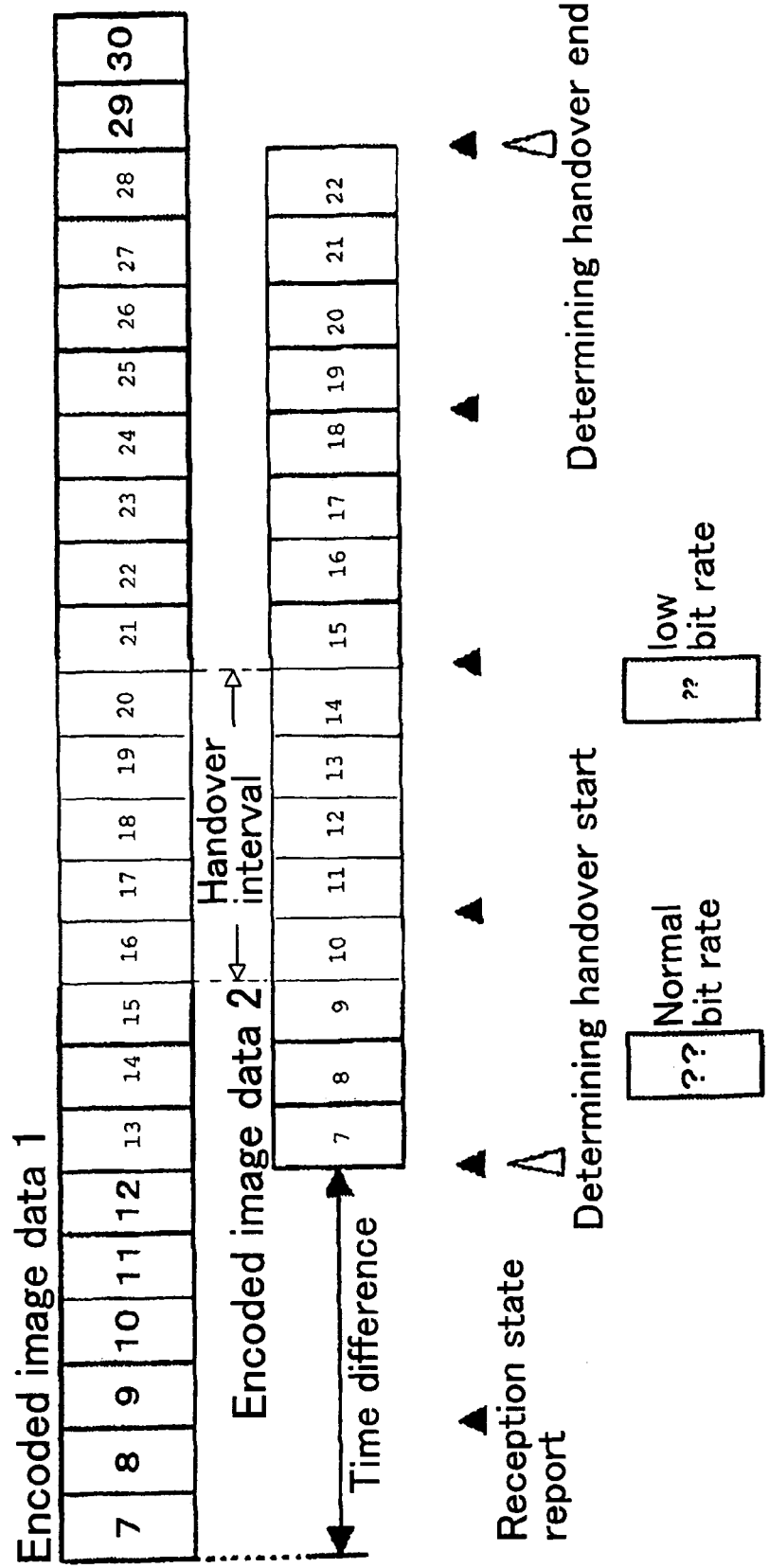
FIG. 6 is a schematic view showing an actual example of the reconstruction of image data at the time of handover in the image data communication system that is the third example of the present invention.

FIG. 6 shows an actual example of the reconstruction of image data at the time of the above-described handover. As encoded image data 1, the data of the $7^{th}$ frame, $8^{th}$ frame, ..., $30^{th}$ frame are sequentially transmitted. At the time of handover, the data of the $7^{th}$ frame, $8^{th}$ frame, ..., $22^{nd}$ frame are sequentially transmitted as encoded image data 2 together with encoded image data 1, a time difference of six frames existing between these encoded image data 1 and 2. In encoded image data 1, the $7^{th}$-$12^{th}$ and $29^{th}$-$30^{th}$ frames (the portion indicated in bold print) are set for transmission at the normal bit rate, and the $13^{th}$-$28^{th}$ frames (the portion indicated by light print) is the portion that is set for transmission at a lower bit rate. In encoded image data 2, the $7^{th}$-$22^{nd}$ frames (the portion indicated by light print) is the portion that is set for transmission at a low bit rate.

In the example of FIG. 6, image data reception device 307 transmits a reception state report to image data distribution device 301 every six frames. Image data distribution device 301 determines the start of handover at the time of receiving the $12^{th}$ frame of encoded image data 1, and determines the end of handover at the time of receiving the $28^{th}$ frame of encoded image data 1. In image data reception device 307, the data of the $7^{th}$-$12^{th}$ frames of encoded image data 1 are received at the normal bit rate before the start of handover and the data of the $29^{th}$-$30^{th}$ frames of encoded image data 1 are received at the normal bit rate after the end of handover.

During the interval from the start and until the end of handover, control is implemented such that encoded image data 1 and 2 are both received in image data reception device 307 at the low bit rate. As a result, after the start of handover, data are transmitted at the low bit rate from the $13^{th}$ frame of encoded image data 1, and data are transmitted at the low bit rate from the $7^{th}$ frame of encoded image data 2. In this way, image data are both received in image data reception device 307 from the $13^{th}$ frame of encoded image data 1 and from the $7^{th}$ frame of encoded image data 2.

The interval of the $16^{th}$-$20^{th}$ frames of encoded image data 1 (the $10^{th}$-$14^{th}$ frames in encoded image data 2) is within the handover interval, and neither of encoded image data 1 and 2 can be received in image data reception device 307 during this handover interval. As a result, data of the $16^{th}$-$20^{th}$ frames for encoded image data 1 are lost during this handover interval, and the data of the $10^{th}$-$14^{th}$ frames are lost for encoded image data 2.

In the interval after the end of the handover interval and up to the determination of the end of handover, data are sequentially received at the low bit rate from the $21^{st}$ frame for encoded image data 1 and from the $15^{th}$ frame for encoded image data 2 in image data reception device 307. In this way, data of the $13^{th}$-$15^{th}$ and the $21^{st}$-$28^{th}$ frames of encoded image data 1 and data of the $7^{th}$-$9^{th}$ and the $15^{th}$-$22^{nd}$ frames of encoded image data 2 are both received in image data reception device 307 during the interval from the start and until the end of handover. Reconstruction of the image data is then realized by selecting the $13^{th}$-$28^{th}$ frames from these encoded image data that have been received and then arranging the data in the correct order. In this way, the $16^{th}$-$20^{th}$ frames of encoded image data 1 that were lost during the handover interval are compensated.

WORKING EXAMPLE 5

Figure 7:
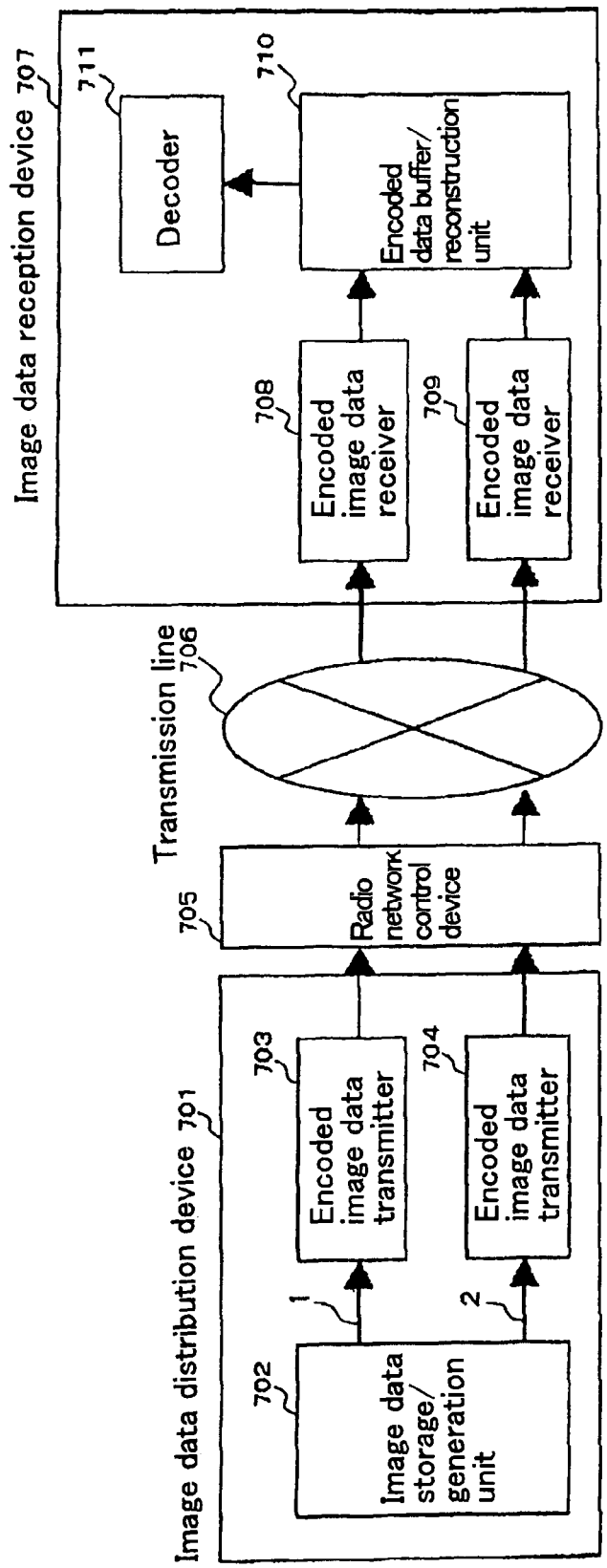
FIG. 7 is a block diagram showing a schematic configuration of the image data communication system that is the fifth working example of the present invention.

FIG. 7 shows a schematic configuration of the image data communication system that is the fifth working example of the present invention. In this image data communication system, image data distribution device 701 and image data reception device 707 are connected so as to allow communication with each other by way of radio network control device 705 and transmission line 106 in which an IP network is constructed on a radio physical layer.

Image data distribution device 701 uses UDP/IP to distribute encoded image data to image data reception device 107 and is of a construction that is composed of image data storage/generation unit 702 and encoded image data transmitters 703 and 704. Image data storage/generation unit 702 and encoded image data transmitters 703 and 704 are basically the same as image data storage/generation unit 102 and encoded image data transmitters 104 and 105 that are shown in FIG. 1.

Radio network control device 705 monitors handover operations in image data reception device 707 based on line states such as the bit error rate on the radio transmission line of transmission line 706 of the encoded image data that are received in image data reception device 707. In addition, during normal operation, radio network control device 705 transmits encoded image data 1, which are transmitted from encoded image data transmitter 703, with higher priority and/or power such that encoded image data 1 are received with priority in image data reception device 107, and further, regarding encoded image data 2 that are transmitted from encoded image data transmitter 704, either does not transmit encoded image data 2 or transmits encoded image data 2 with lower priority and/or at lower power. In addition, at the time of handover, radio network control device 705 lowers the priority and/or power of encoded image data 1 and either causes encoded image data 2 to be transmitted or raises the priority and/or power such that encoded image data 1 and 2 that are transmitted from encoded image data transmitters 703 and 704 are both received in image data reception device 107.

Image data reception device 707 is a client terminal connected to a radio IP network and is of a configuration that includes encoded image data receivers 708 and 709, encoded data buffer/reconstruction unit 710, and decoder 711. These encoded image data receivers 708 and 709, encoded data buffer/reconstruction unit 710, and decoder 711 are basically the same as encoded image data receivers 109 and 110, encoded data buffer/reconstruction unit 111, and decoder 112, respectively, that are shown in FIG. 1.

The following explanation regards the actual operation of the image data communication system of the present working example.

Explanation first regards normal operation, i.e., operation while image data reception device 707 is moving within a particular radio area (cell). In image data distribution device 701, encoded image data transmitter 703 transmits encoded image data 1 and encoded image data transmitter 704 transmits, delayed from the transmission of encoded image data 1 by a prescribed time interval, encoded image data 2 that are identical to encoded image data 1.

Radio network control device 705 transmits encoded image data 1 that are sent from encoded image data transmitter 703 at a higher priority and/or power and either does not transmit encoded image data 2 that are sent from encoded image data transmitter 704 or transmits encoded image data 2 at a lower priority and/or power. In this way, overflow of transmission line 706 due to excessive traffic is suppressed.

In image data reception device 707, at least encoded image data 1 is received in encoded image data receiver 708. These encoded image data 1 that are received are temporarily stored in encoded data buffer/reconstruction unit 710 and then supplied to decoder 711 and there subjected to a decoding process.

Explanation next regards operation at the time of handover, i.e., when image data reception device 707 moves from the current radio area to another neighboring radio area while receiving encoded image data 1.

As distance from the base station of the current radio area increases, the bit error rate on the radio transmission line of transmission line 706 for the encoded image data that are received in image data reception device 707 increases. When the bit error rate exceeds a prescribed value, radio network control device 705 determines the start of handover and lowers the priority and/or power for encoded image data 1 and either causes encoded image data 2 to be transmitted or raises the priority and/or power for encoded image data 2 such that encoded image data 1 and 2 that are transmitted from encoded image data transmitters 703 and 704 are received in image data reception device 107. In this way, encoded image data 1 and 2 are both received in image data reception device 707.

As the distance from the base station of the current radio area increases further, the reception state of encoded image data 1 and 2 in image data reception device 707 further deteriorates until reception eventually becomes impossible. This point in time at which the reception of encoded image data 1 and 2 becomes impossible is the start of the handover interval. On the other hand, as image data reception device 707 approaches the base station within another radio area that is the destination of movement, the reception state of encoded image data 1 and 2 in image data reception device 707 gradually improves until the reception of encoded image data 1 and 2 becomes possible. This point in time at which the reception of encoded image data 1 and 2 becomes possible is the end of the handover interval. During the handover interval, neither of encoded image data 1 and 2 can be received in image data reception device 707 and data are therefore lost.

When the reception of encoded image data 1 and 2 becomes possible, the bit error rate decreases on the radio transmission line of transmission line 706 for the encoded image data that are received in image data reception device 707. After the passage of a prescribed time interval from the time at which the bit error rate falls below a prescribed value, radio network control device 705 determines the end of handover and both transmits encoded image data 1 that are transmitted from encoded image data transmitter 703 with higher priority and/or at higher power and either prevents the transmission of encoded image data 2 that are transmitted from encoded image data transmitter 704 or transmits encoded image data 2 with lower priority and/or at lower power.

During a prescribed interval following the end of the handover interval, encoded image data 1 and 2 are both received in image data reception device 707. Encoded image data 2 that are received during this prescribed interval contain all or a portion of the data of encoded image data 1 that were lost during the handover interval. Encoded data buffer/reconstruction unit 710 selects data that correspond to the lost data of encoded image data 1 from encoded image data 2 that have been received and correctly arranges the selected data and the received encoded image data 1 to reconstruct one set of image data. By means of this reconstruction, all or a portion of the lost data of encoded image data 1 are compensated. These reconstructed image data are then supplied to decoder 312 and there subjected to decoding.

After the above-described prescribed interval, operation is carried out that is the same as the above-described normal operation in image data reception device 707.

Figure 8:
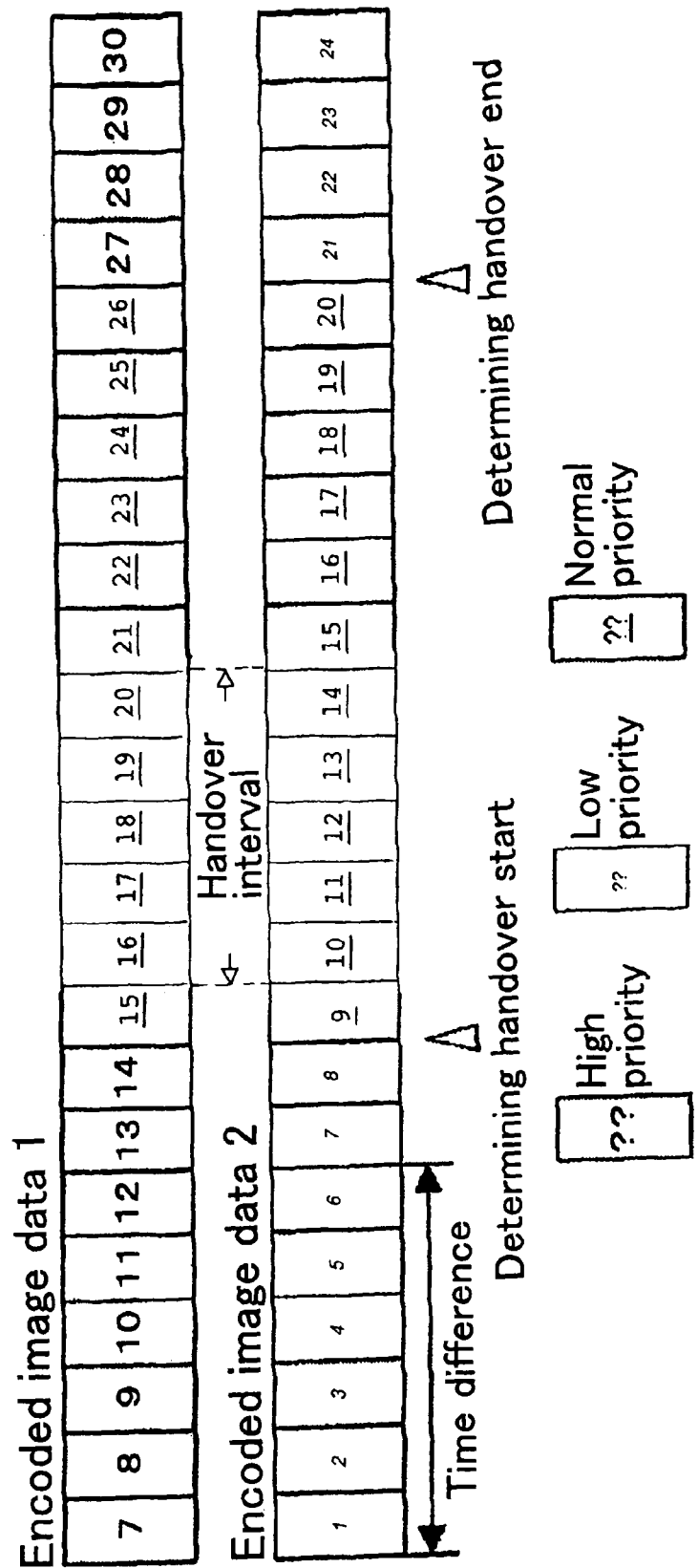
FIG. 8 is a schematic view showing an actual example of the reconstruction of image data at the time of handover in the image data communication system shown in FIG. 7.

FIG. 8 shows an actual example of the reconstruction of image data at the time of the above-described handover. As encoded image data 1, data of the $7^{th}$ frame, $8^{th}$ frame, ..., $30^{th}$ frame are transmitted in that order, and as encoded image data 2, data of the $1^{st}$ frame, $2^{nd}$ frame, ..., $24^{th}$ frame are transmitted in that order, a time difference of six frames existing between these sets of encoded image data 1 and 2. In encoded image data 1, the $7^{th}$-$14^{th}$ and the $27^{th}$-$30^{th}$ frames (the portion indicated in bold print) are the portions that are set for high priority, and the $15^{th}$-$26^{th}$ frames (the portion indicated by light print) is the portion that is set such that priority is lower. In encoded image data 2, the $1^{st}$-$8^{th}$ and the $21^{st}$-$24^{th}$ frames (the portions indicated by small characters)

are the portions that is set to low priority, and the $9^{th}$-$20^{th}$ frames (the portion indicated by underlined characters) is the portion that is set to normal priority.

In the example of FIG. 8, radio network control device 705 determines the start of handover at the point in time at which the $14^{th}$ frame of encoded image data 1 is received in image data reception device 707 and determines the end of handover at the point in time at which the $26^{th}$ frame of encoded image data 1 is received in image data reception device 707. In image data reception device 307, data of the $7^{th}$-$14^{th}$ frames of encoded image data 1 are received with priority before the start of handover, and data of the $27^{th}$-$30^{th}$ frames of encoded image data 1 are received with priority after the end of handover.

During the interval from the start and until the end of handover, the priority and/or power are controlled such that encoded image data 1 and 2 are both received in image data reception device 707. As a result, after the start of handover, priority becomes lower for encoded image data 1 from the $15^{th}$ frame, and priority becomes normal for encoded image data 2 from the $9^{th}$ frame, whereby image data are both received in image data reception device 707 from the $15^{th}$ frame for encoded image data 1 and from the $9^{th}$ frame for encoded image data 2.

The interval from the $16^{th}$ frame and until the $20^{th}$ frame of encoded image data 1 (from the $10^{th}$ frame and until the $14^{th}$ frame of encoded image data 2) is within the handover interval, and neither of encoded image data 1 and 2 can be received in image data reception device 707 during this handover interval. As a result, the data of the $16^{th}$-$20^{th}$ frames are lost for encoded image data 1, and data of the $10^{th}$-$14^{th}$ frames are lost for encoded image data 2 during this handover interval.

In the interval following the end of the handover interval and up to the end of handover, image data are sequentially received in image data reception device 707 from the $21^{st}$ frame for encoded image data 1 and from the $15^{th}$ frame for encoded image data 2. Consequently, data of the $15^{th}$ and $21^{st}$-$26^{th}$ frames of encoded image data 1 and data of the $9^{th}$ and $15^{th}$-$20^{th}$ frames of encoded image data 2 are both received in image data reception device 707 during the interval from the start and until the end of handover. Reconstruction of image data is then carried out from these $21^{st}$-$26^{th}$ frames of encoded image data 1 and the $15^{th}$-$20^{th}$ frames of encoded image data 2 that have been received, whereby the $16^{th}$-$20^{th}$ frames of encoded image data 1 that were lost during the handover interval are compensated by the $16^{th}$-$20^{th}$ frames of encoded image data 2.

WORKING EXAMPLE 6

Figure 9:
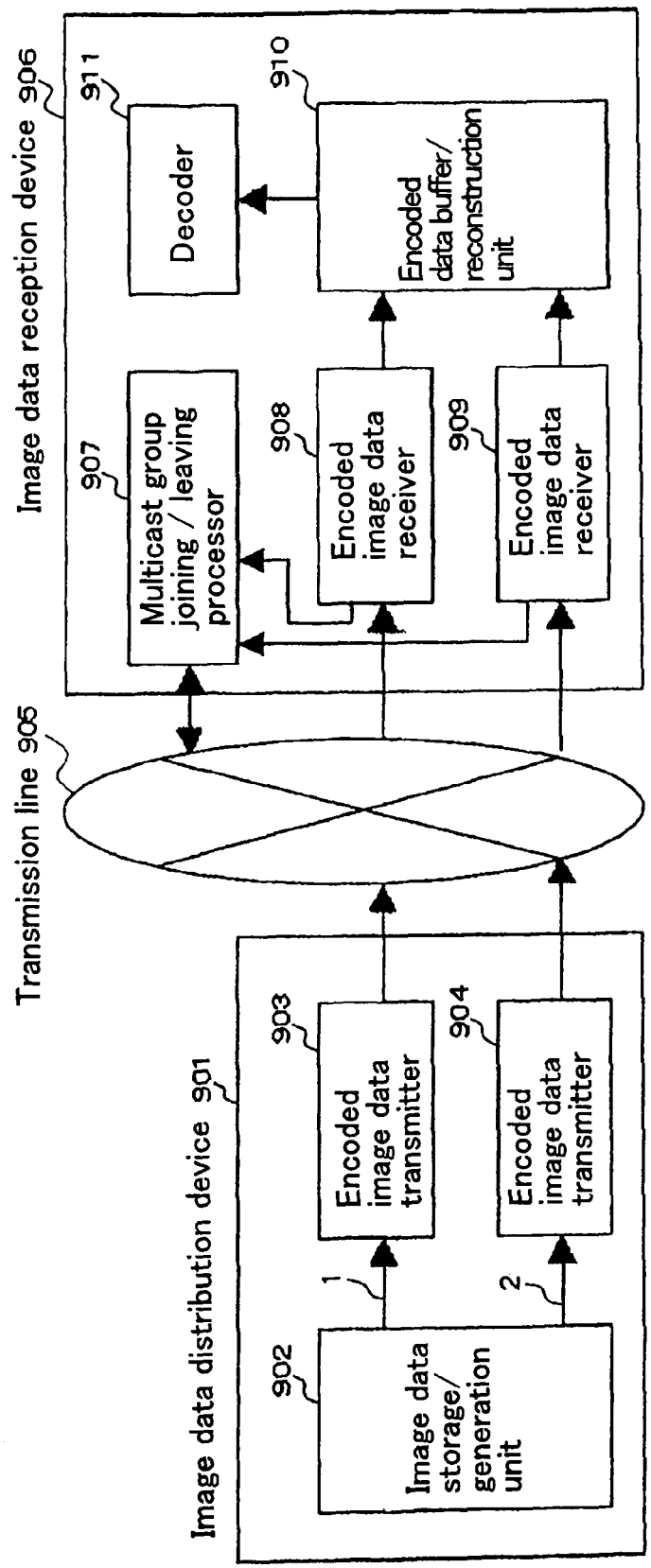
FIG. 9 is a block diagram showing the schematic configuration of the image data communication system that is the sixth working example of the present invention.

FIG. 9 shows a schematic configuration of the image data communication system that is the sixth working example of the present invention. In this image data communication system, image data distribution device 901 and image data reception device 906 are connected so as to allow communication by way of transmission line 905 in which an IP network is constructed on a radio physical layer.

Image data distribution device 901 uses UDP/IP to distribute encoded image data to image data reception device 906 and is of a configuration that includes image data storage/generation unit 902 and encoded image data transmitters 903 and 904. Image data storage/generation unit 902 and encoded image data transmitters 903 and 904 are the same as image data storage/generation unit 303 and encoded image data transmitters 304 and 305 that are shown in FIG. 3, but in the present working example, encoded image data transmitters 903 and 904 distribute encoded image data 1 and 2, respectively, by multicast (broadcast) in different sessions.

Transmission line 905 is a network that allows forwarding of multicast traffic and that supports IGMP (Internet Group Management Protocol) for controlling joining/leaving a multicast group or protocols that are equivalent to IGMP.

Image data reception device 9206 is a client terminal that is connected to a radio IP network and is of a configuration that includes multicast group joining/leaving processor 907, encoded image data receivers 908 and 909, encoded data buffer/reconstruction unit 910, and decoder 911. Encoded image data receivers 908 and 909, encoded data buffer/reconstruction unit 910, and decoder 911 are basically the same as encoded image data receivers 309 and 310, encoded data buffer/reconstruction unit 311, and decoder 312 that are shown in FIG. 3.

During normal operation, multicast group joining/leaving processor 907 joins the multicast group of encoded image data 1 that are distributed by encoded image data transmitter 903 and determines the start of handover based on the reception state of encoded image data 1. After determining the start of handover, multicast group joining/leaving processor 907 also joins the multicast group of encoded image data 2 that are distributed by encoded image data transmitter 904 and determines the start and end of the handover interval from the reception states of encoded image data 1 and 2. Multicast group joining/leaving processor 907 further determines the end of handover after the passage of a prescribed time interval from the end of the handover interval, and after this determination, leaves the multicast group of encoded image data 2 that are distributed by encoded image data transmitter 904.

Explanation next regards the actual operation of the image data communication system of the present working example.

Explanation first regards normal operation, i.e., operation when image data reception device 906 moves within a particular radio area (cell). During normal operation, multicast group joining/leaving processor 907 has joined the multicast group of encoded image data 1 that is distributed by encoded image data transmitter 903, and encoded image data 1 are therefore received in encoded image data receiver 908 in image data reception device 907. These encoded image data 1 that are received are temporarily stored in encoded data buffer/reconstruction unit 910 and then supplied to decoder 911 where the data undergo decoding.

Explanation next regards operation at the time of handover, i.e., when image data reception device 906 moves from the current radio area to another neighboring radio area while receiving encoded image data 1.

As the distance from the base station of the current radio area increases, the reception state of encoded image data 1 in image data reception device 307 deteriorates and the loss factor increases. When this loss factor exceeds a prescribed value, multicast group joining/leaving processor 907 determines the start of handover and joins the multicast group of encoded image data 2 that are distributed by encoded image data transmitter 904. Thus, after the start of handover, sets of identical encoded image data 1 and 2 having a prescribed time difference are both received in image data reception device 906.

As the distance from the base station of the current radio area further increases, the reception state of encoded image data 1 and 2 deteriorates further and reception eventually becomes impossible in image data reception device 906. This point in time at which reception of encoded image data 1 and 2 becomes impossible is the start of the handover interval. On the other hand, as image data reception device 906 approaches the base station within the other radio area that is the destination of movement, the reception state of encoded image data 1 and 2 gradually improves in image data reception device 906 and reception of encoded image data 1 and 2 eventually becomes possible. This point in time at which reception of encoded image data 1 and 2 becomes possible is the end of the handover interval. During the handover interval, neither of encoded image data 1 and 2 can be received in image data reception device 906, and data are therefore lost.

During a prescribed interval after the end of the handover interval, multicast group joining/leaving processor 907 belongs to the multicast groups of each of encoded image data 1 and 2 that are distributed by encoded image data transmitter 904, and encoded image data 1 and 2 are therefore both received in image data reception device 907. Encoded image data 2 that are received during this prescribed interval contain all or a portion of the data of encoded image data 1 that were lost during the handover interval. Encoded data buffer/reconstruction unit 910 selects data that correspond to the lost data of encoded image data 1 from encoded image data 2 that have been received, and correctly arranges these selected data with the received encoded image data 1 to reconstruct one set of image data. By means of this reconstruction, all or a portion of the lost data of encoded image data 1 are compensated. The image data that are reconstructed in this way are then supplied to decoder 911 and there decoded.

After the above-described prescribed interval, multicast group joining/leaving processor 907 determines the end of handover and leaves the multicast group of encoded image data 2 that are distributed by encoded image data transmitter 904. The reception of encoded image data 2 is thus halted in image data reception device 307, and the same operation is then carried out as in the above-described normal operation.

According to the image data communication system of each of the above-described working examples 1-6, all or a portion of data that are lost during a handover interval can be compensated, whereby higher image quality can be provided.

In addition, when surplus network resources exist, an image data reception device can receive both of encoded image data 1 and 2, whereby, even if one set of encoded image data should be lost, the loss can be compensated by the other set of encoded image data. Greater stability of image quality can thus be obtained for cases other than handover intervals. Further, methods may be adopted that make use of a broadcast method. For example, encoded image data 1 and 2 may be always received, or only encoded image data 1 may be received during normal operation and the start of reception and halt of reception of encoded image data 2 then carried out respectively before and after handover. These methods do not entail the processes of joining and leaving multicast groups. Although the consumption of network resources may be great in these examples, the need for multicast group joining/leaving processor 907 is eliminated and processing can be simplified.

The image data communication systems of each of the above-described working examples are merely examples. The present invention is not limited to the forms shown in the figures in each of these working examples, and its configuration can be modified as appropriate. For example, reconstruction was realized by selecting necessary data from two sets of identical encoded image data having a prescribed time difference, but the data that are used in this reconstruction may also be three or more sets of identical encoded image data having prescribed time differences. In such a case, reconstruction using three or more sets of identical encoded image data having prescribed time differences can compensate for lost frames with greater reliability.

In addition, a configuration may be adopted having a plurality of transmission lines, and each of encoded image data 1 and 2 may be transmitted by means of a different transmission line.

Still further, although encoded image data were transmitted in the explanation of the working examples, it is also possible to simply distribute stored moving picture image data in place of these encoded image data, or to transmit moving picture image data that are generated by converting already existing image data in real time.

In the image data communication system of each of the above-described working examples, the image data distribution device and the image data communication device correspond to, for example, a server and a client terminal, respectively; and either device is realized by a computer system that is provided with a memory device for storing programs. All of the operations in the image data distribution device and image data communication device that were described in each of the above working examples were carried out by programs that cause computers to execute processes relating to the operations.

In addition, the frames of encoded image data of each of the above-described working examples may be image data packets in which the same points of the same frames of each set of encoded image data are encoded.

Finally, although the present invention was described in conformity with the above-described embodiment, the present invention is not limited to the form of the above-described embodiment and is of course open to various modifications and variations that may occur to a person skilled in the art within the scope of the invention as described in each of the patent claims.

The invention claimed is:

1. An image data communication system, comprising:
    an image data distribution device for sequentially distributing, over a transmission resource, a plurality of sets of identical moving picture image data with prescribed time differences; and
    an image data reception device for receiving, from the transmission resource, moving picture image data that are distributed from said image data distribution device while moving among a plurality of radio areas,
    wherein when the transmission resource is sufficient to distribute the moving picture image data,
    said image data reception device, at a time of handover that occurs when moving from a current radio area to another neighboring radio area, receives over a prescribed interval said plurality of sets of identical moving picture image data having prescribed time differences that are distributed from said image data distribution device and selects necessary data from the received moving picture image data to reconstruct one set of moving picture image data, and
    said image data distribution device, during only said prescribed interval, performs priority control such that said plurality of sets of identical moving picture image data having prescribed time differences are received together in said image data reception device, and
    wherein when the transmission resource is not sufficient to distribute the moving picture image data,
    said image data reception device, at the time of handover, receives only one of said plurality of sets of identical moving picture image data, and
    said image data distribution device performs priority control by discarding ones of said plurality of sets of identical moving picture image data other than said only one.

2. The image data communication system according to claim 1, wherein said plurality of sets of identical moving picture image data are a plurality of sets of encoded image data in which identical image data have been encoded by the same encoding method.

3. The image data communication system according to claim 2, wherein the transmission resource is a transmission line and wherein:

said image data distribution device includes:

encoded image data transmission means for both sequentially transmitting on the transmission line said plurality of sets of identical encoded image data with prescribed time differences in at least said prescribed interval and, during this transmission, conferring to each of said plurality of sets of identical encoded image data information that is necessary for said reconstruction; and said image data reception device includes:

encoded image data reception means for receiving said plurality of sets of identical encoded image data having said prescribed time differences by way of said transmission line from said encoded image data transmission means; and reconstruction means for referring to information necessary for said reconstruction that has been conferred to the encoded image data to reconstruct, as one set of encoded image data, said plurality of sets of identical encoded image data having said prescribed time differences that have been received in said encoded image data reception means.

4. The image data communication system according to claim 3, wherein:

said image data distribution device further includes a control means for implementing prescribed control setting on said transmission line for said plurality of sets of identical encoded image data having prescribed time differences that are transmitted from said encoded image data transmission means; and said control means performs said prescribed control setting such that during normal operation that excludes said prescribed interval, of said plurality of sets of identical encoded image data having prescribed time differences, at least a prescribed set of encoded image data is received with priority in said image data reception device; and sets said prescribed control such that during said prescribed intervals, said plurality of sets of identical encoded image data having prescribed time differences are both received in said image data reception device.

5. The image data communication system according to claim 4, wherein:

said image data reception device further includes a control information processing means for determining the start and end of said handover based on a reception state of encoded image data in said encoded image data reception means;

said control information processing means both transmits a start notification to said control means when said handover starts and transmits an end notification to said control means after the passage of a prescribed time interval from the end of said handover; and said control means implements said prescribed control setting with the interval from the reception of said start notification until the reception of said end notification as said prescribed interval.

6. The image data communication system according to claim 4, wherein:

said image data reception device further includes a control information processing means for determining the start of said handover based on the reception state of encoded image data in said encoded image data reception means;

said control information processing means transmits to said control means a first request to alter said prescribed control setting at the start of said handover, and transmits to said control means a second request to alter said prescribed control setting after the passage of a prescribed time interval from the end of said handover; and said control means performs said prescribed control setting with the interval from the reception of said first request until the reception of said second request as said prescribed interval.

7. The image data communication system according to claim 4, wherein:

said image data reception device further includes a reception state report means for reporting the reception state of encoded image data in said encoded image data reception means to said image data distribution device at prescribed intervals; and said control means determines the start and end of said handover based on reports of the reception state from said reception state report means, and implements said prescribed control setting with an interval that includes said handover interval and an interval from said end until the passage of a prescribed time interval as said prescribed interval.

8. The image data communication system according to claim 4, wherein said prescribed control setting is routing priority control on said transmission line.

9. The image data communication system according to claim 8, wherein during said normal operation, said control means sets said routing priority that relates to, of said plurality of sets of identical encoded image data having prescribed time differences, said prescribed encoded image data higher than for other encoded image data; and during said prescribed interval, both sets said routing priority that relates to said prescribed encoded image data lower than during said normal operation and sets said routing priority that relates to said other encoded image data higher than during said normal operation.

10. The image data communication system according to claim 4, wherein said prescribed control setting is power control on a radio transmission line that is a portion of said transmission line.

11. The image data communication system according to claim 10, wherein: during said normal operation, said control means sets power on said radio transmission line that relates to, of said plurality of sets of identical encoded image data having prescribed time differences, said prescribed encoded image data higher than for other encoded image data, and during said prescribed interval, both sets power on said radio transmission line that relates to said prescribed encoded image data lower than during said normal operation and sets power on said radio transmission line that relates to said other encoded image data higher than during said normal operation.

12. The image data communication system according to claim 4, wherein said prescribed control setting is the bit rate of encoded image data that are transmitted on said transmission line.

13. The image data communication system according to claim 12, wherein: during said normal operation, said control means sets said bit rate that relates to, of said plurality of sets of identical encoded image data having prescribed time differences, said prescribed encoded image data higher than for other encoded image data; and during said prescribed interval, both sets said bit rate that relates to said prescribed encoded image data lower than during said normal operation and sets said bit rate that relates to said other encoded image data higher than during said normal operation.

14. An image data communication method carried out in a communication system in which an image data distribution device and an image data reception device are connected so as to allow distribution of moving picture image data by way of a transmission resource, said image data communication method comprising:

when the transmission resource is sufficient to distribute the moving picture image data, a first step in which said image data distribution device sequentially distributes a plurality of sets of identical moving picture image data with prescribed time differences to said image data reception device;

a second step in which said image data reception device, at a time of handover that occurs when moving from a current radio area to another neighboring radio area, receives over a prescribed interval said plurality of sets of identical moving picture image data having prescribed time differences that have been distributed from said image data distribution device, and selects necessary data from the moving picture image data that have been received to reconstruct one set of moving picture image data; and a third step in which said image data distribution device performs priority control such that, only during said prescribed interval, said plurality of sets of identical moving picture image data having prescribed time differences are received together in said image data reception device, and when the transmission resource is not sufficient to distribute the moving picture image data, said image data reception device, at the time of handover, receives only one of said plurality of sets of identical moving picture image data, and said image data distribution device performs priority control by discarding ones of said plurality of sets of identical moving picture image data other than said only one.

15. The image data communication method according to claim 14, wherein:

said first step includes a step in which said image data distribution device, when transmitting said plurality of sets of identical moving picture image data, confers to each of said plurality of sets of identical moving picture image data information necessary for said reconstruction; and said second step includes a step in which said image data reception device refers to said information necessary for said reconstruction that has been conferred to said moving picture image data to reconstruct said plurality of sets of identical moving picture image data having prescribed time differences that have been distributed from said image data distribution device in said prescribed interval as one set of moving picture image data.

16. The image data communication method according to claim 14, wherein said third step includes:

a step in which said image data distribution device, during normal operation that excludes said prescribed interval, sets prescribed control on said transmission resource such that, of said plurality of sets of identical moving picture image data having prescribed time differences, at least prescribed moving picture image data are received with priority in said image data reception device; and a step in which said image data distribution device, during said prescribed interval, sets said prescribed control such that said plurality of sets of identical moving picture image data having prescribed time differences are received together in said image data reception device.

17. The image data communication method according to claim 16, wherein:

said second step includes:

a step in which said image data reception device determines the start and end of said handover based on the reception state of said moving picture image data; and a step in which said image data reception device both transmits to said image data distribution device a start notification when said handover starts and transmits to said image data distribution device an end notification after the passage of a prescribed time interval from the end of said handover; and said third step includes:

a step in which said image data distribution device implements said prescribed control setting with the interval from the reception of said start notification until reception of said end notification as said prescribed interval.

18. The image data communication method according to claim 16, wherein:

said second step includes:

a step in which said image data reception device determines the start and end of said handover based on the reception state of said moving picture image data; and a step in which said image data reception device transmits to said image data distribution device a first request to alter said prescribed control setting when said handover starts, and transmits to said image data reception device a second request to alter said prescribed control setting after the passage of a prescribed time interval from the end of said handover; and said third step includes:

a step in which said image data distribution device performs said prescribed control setting with the interval from the reception of said first request until the reception of said second request as said prescribed interval.

19. The image data communication method according to claim 16, wherein:

said second step includes a step in which said image data reception device reports to said image data distribution device at prescribed time intervals the reception state of said moving picture image data; and said third step includes a step in which said image data distribution device determines the start and end of said handover based on the reports of reception state from said image data reception device, and performs said prescribed control setting with the interval that includes the interval of said handover and the interval from said end until the passage of a prescribed time interval as said prescribed interval.

20. The image data communication method according to claim 16, wherein said prescribed control setting is control of routing priority on said transmission line.

21. The image data communication method according to claim 20, wherein said third step includes a step in which said image data distribution device, during said normal operation, sets said routing priority that relates to said prescribed moving picture image data of said plurality of sets of identical moving picture image data having prescribed time differences higher than for other moving picture image data, and during said prescribed interval, both sets said routing priority that relates to said prescribed moving picture image data lower than during said normal operation and sets said routing priority that relates to said other moving picture image data higher than during said normal operation.

22. The image data communication method according to claim 16, wherein said prescribed control setting is power control on a radio transmission line of said transmission line.

23. The image data communication method according to claim 22, wherein said third step includes a step in which said image data distribution device, during said normal operation, sets power on said radio transmission line that relates to said prescribed moving picture image data of said plurality of sets of identical moving picture image data having prescribed time differences higher than for other moving picture image data, and during said prescribed interval, both sets power on said radio transmission line that relates to said prescribed moving picture image data lower than during said normal operation and sets power on said radio transmission line that relates to said other moving picture image data higher than during said normal operation.

24. The image data communication method according to claim 16, wherein said prescribed control setting is the bit rate of encoded image data that are transmitted on said transmission line.

25. The image data communication method according to claim 24, wherein in said third step, said image data distribution device, during said normal operation, sets said bit rate that relates to said prescribed moving picture image data of said plurality of sets of identical moving picture image data having prescribed time differences higher than for other moving picture image data, and during said prescribed interval, both sets said bit rate that relates to said prescribed moving picture image data lower than during said normal operation and sets said bit rate that relates to said other moving picture image data higher than during said normal operation.

* * * * *